United States Patent
Saji et al.

(10) Patent No.: US 10,012,310 B2
(45) Date of Patent: Jul. 3, 2018

(54) HYDRAULIC CONTROL UNIT FOR AUTOMATIC TRANSMISSION

(71) Applicant: MAZDA MOTOR CORPORATION, Hiroshima (JP)

(72) Inventors: Koshiro Saji, Hiroshima (JP); Shinya Kamada, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 57 days.

(21) Appl. No.: 15/025,423

(22) PCT Filed: Aug. 4, 2015

(86) PCT No.: PCT/JP2015/003925
§ 371 (c)(1),
(2) Date: Mar. 28, 2016

(87) PCT Pub. No.: WO2016/047018
PCT Pub. Date: Mar. 31, 2016

(65) Prior Publication Data
US 2016/0298759 A1 Oct. 13, 2016

(30) Foreign Application Priority Data
Sep. 24, 2014 (JP) .................................. 2014-194178

(51) Int. Cl.
*F16H 61/686* (2006.01)
*F16H 61/02* (2006.01)
(Continued)

(52) U.S. Cl.
CPC ..... *F16H 61/0267* (2013.01); *F16H 61/0031* (2013.01); *F16H 61/0276* (2013.01);
(Continued)

(58) Field of Classification Search
CPC ......... Y10T 477/69395; F16H 61/0267; F16H 61/0276; F16H 61/0031; F16H 2061/0279; F16H 2061/0015; F16H 2312/20
(Continued)

(56) References Cited

U.S. PATENT DOCUMENTS

2005/0137043 A1 6/2005 Kinugasa et al.
2011/0319227 A1 12/2011 Kamada et al.
(Continued)

FOREIGN PATENT DOCUMENTS

| CN | 1619193 A | 5/2005 |
|---|---|---|
| CN | 102328653 A | 1/2012 |

(Continued)

OTHER PUBLICATIONS

International Search Report and Written Opinion issued in Application No. PCT/JP2015/003925, dated Nov. 2, 2015.

*Primary Examiner* — Roger L Pang
(74) *Attorney, Agent, or Firm* — Studebaker & Brackett PC

(57) ABSTRACT

A hydraulic control unit for an automatic transmission has a mechanically-operated oil pump (6), an electrically-operated oil pump (106) actuated while an engine (2) is automatically shut down, and a hydraulic pressure circuit (100) which controls supply of hydraulic pressure to a frictional engagement element (40, 60) to be engaged, in the automatic transmission, at a vehicle's start. In the hydraulic pressure circuit, discharge oil from the electrically-operated oil pump is drained from a predetermined drain portion (154) when a selector valve (120) is in the first state (in which the mechanically-operated oil pump is a source of the supply of the hydraulic pressure to the frictional engagement element), whereas less discharge oil is drained from the drain portion, compared to the first state, when the selector valve (120) is (Continued)

in the second state (in which the electrically-operated oil pump is the source of the supply of the hydraulic pressure).

7 Claims, 13 Drawing Sheets

(51) Int. Cl.
*F16H 61/00* (2006.01)
*F16H 3/66* (2006.01)

(52) U.S. Cl.
CPC ............ *F16H 3/666* (2013.01); *F16H 61/686* (2013.01); *F16H 2061/0015* (2013.01); *F16H 2061/0279* (2013.01); *F16H 2200/0052* (2013.01); *F16H 2200/201* (2013.01); *F16H 2200/2043* (2013.01); *F16H 2312/20* (2013.01)

(58) Field of Classification Search
USPC .......................................................... 475/137
See application file for complete search history.

(56) References Cited

U.S. PATENT DOCUMENTS

| | | |
|---|---|---|
| 2012/0252631 A1 | 10/2012 | Saji et al. |
| 2016/0016587 A1 | 1/2016 | Saji et al. |
| 2016/0221579 A1* | 8/2016 | Sasahara ............... F16H 61/686 |

FOREIGN PATENT DOCUMENTS

| | | |
|---|---|---|
| CN | 102734456 A | 10/2012 |
| JP | 2005-282643 A | 10/2005 |
| JP | 2010-101427 A | 5/2010 |
| JP | 2012-013144 A | 1/2012 |
| WO | 2014/141590 A1 | 9/2014 |

* cited by examiner

FIG.2

| | LOW CLUTCH (40) | HIGH CLUTCH (50) | LR BRAKE (60) | 26 BRAKE (70) | R35 BRAKE (80) |
|---|---|---|---|---|---|
| FIRST GEAR | ○ | | ○ | | |
| SECOND GEAR | ○ | | | ○ | |
| THIRD GEAR | ○ | | | | ○ |
| FOURTH GEAR | ○ | ○ | | | |
| FIFTH GEAR | | ○ | | | ○ |
| SIXTH GEAR | | ○ | | ○ | |
| REVERSE GEAR | | | ○ | | ○ |

HYDRAULIC CONTROL UNIT FOR AUTOMATIC TRANSMISSION

TECHNICAL FIELD

The present invention relates to a hydraulic control unit for an automatic transmission mounted on a vehicle (specifically a vehicle with an idle stop control mechanism which automatically shuts down the engine while the vehicle stops).

BACKGROUND ART

In recent years, vehicles with an idle stop control mechanism, which automatically shuts down the engine while the vehicle stops, for example, at a red light, when predetermined shutdown conditions have been met, have been in practical use. The automatic transmission mounted on such a vehicle includes an electrically-operated oil pump, in addition to a mechanically-operated oil pump driven by the engine, to make a prompt start at the vehicle's next start. The hydraulic pressure generated by this electrically-operated oil pump is used to bring a frictional engagement starting element, which is engaged at a start of the vehicle to transmit power, into an engaged state in advance or into a ready-to-engage state while the engine is automatically shut down.

Examples of the ready-to-engage state include bringing the frictional engagement starting element into a slip state, and in the case of double-piston type frictional engagement starting element having an engagement piston and a clearance adjustment piston, bringing the frictional engagement starting element into a state in which the hydraulic pressure is supplied only to a hydraulic pressure chamber for the clearance adjustment piston.

With respect to such a hydraulic control unit for the automatic transmission, Patent Document 1 discloses a hydraulic pressure circuit 600 having a selector valve 620 at a path for supplying hydraulic pressure to a frictional engagement starting element 610, as illustrated in FIG. 13. The selector valve 620 switches the hydraulic pressure supply source to a mechanically-operated oil pump 606 (hereinafter referred to as a mechanical pump 606) or to an electrically-operated oil pump 616 (hereinafter referred to as an electric pump 616). In this hydraulic pressure circuit 600, the spool 622 of the selector valve 620 is movable between a first position at which the mechanical pump 606 is the hydraulic pressure supply source, and a second position at which the electric pump 616 is the hydraulic pressure supply source. Specifically, while the engine is in operation, the hydraulic pressure is input to a control port 630 from the mechanical pump 606, causing the spool 622 to be located at the first position (the position on the right side in FIG. 13). On the other hand, while the engine is shut down, the hydraulic pressure is not supplied to the control port 630 from the mechanical pump 616, and hence, the elastic force of a return spring 640 causes the spool 622 to be located at the second position (the position on the left side in FIG. 13).

Actuation of the electric pump 616 is started at the implementation of an automatic shutdown of the engine. At this start of actuation, a discharge line 650 of the electric pump 616 is blocked by the spool 622 that is still present at the first position. Here, a drain line 660 provided with an orifice 662 branches from a portion of the discharge line 650 between the electric pump 616 and the selector valve 620. This drain line 660 prevents the discharge oil from the electric pump 616 from being trapped in the discharge line 650. As a result, the motor 615 which drives the electric pump 616 is prevented from receiving an excessive load at the start of actuation of the electric pump 616. This leads to reduced energy loss due to heat generation, and reduced degradation of the durability. In addition, in the case where the electric pump 616 is of an automatic rotation control type, phenomena, such as step-outs, in which the rotation cannot be properly controlled, can be reduced.

CITATION LIST

Patent Document

Patent Document 1: Japanese Unexamined Patent Publication No. 2012-013144

SUMMARY OF THE INVENTION

Technical Problem

In the known hydraulic pressure circuit 600 illustrated in FIG. 13, the drain line 660 branches from the portion of the discharge line 650 between the electric pump 616 and the selector valve 620. Although the drain amount is reduced by the orifice 662, the drain line 660 causes part of the oil discharged from the electric pump 616 to be always drained, irrespective of the state of the selector valve 620. Thus, unnecessary draining is carried out through the drain line 660, even when the spool 622 of the selector valve 620 has moved to the second position and thus the discharge line 650 communicates with the frictional engagement starting element 610 (i.e., even when it is not necessary to drain the discharge oil from the electric pump 616). This results in waste of energy used to activate the electric pump 616, and leads to an increase in the capacity, and hence an increase in size, of the electric pump 616, and an increase in the power consumption while the engine is automatically shut down.

Particularly in the case of an automatic transmission configured to achieve the first gear by engaging two frictional engagement elements, instead of a one-way clutch which has been used as the first gear, in order to improve the fuel efficiency of the engine, such an automatic transmission has an increased number of targets to which the hydraulic pressure is supplied by the electric pump while the engine is being automatically shut down. This leads to a significant increase in the capacity of the electric pump.

In view of the foregoing, it is therefore an object of the present invention to provide a hydraulic control unit for an automatic transmission which allows for reducing the capacity of an electrically-operated oil pump that is actuated while the engine is being automatically shut down, while reducing an excessive load on the electrically-operated oil pump.

Solution to the Problem

To achieve the above object, the present invention is directed to a hydraulic control unit for an automatic transmission mounted on a vehicle. The hydraulic control unit includes: a mechanically-operated oil pump driven by an engine of the vehicle; an electrically-operated oil pump actuated while the engine is automatically shut down; and a hydraulic pressure circuit configured to control supply of hydraulic pressure to a frictional engagement element to be engaged, in the automatic transmission, at a start of the vehicle. The hydraulic pressure circuit has a selector valve switched between a first state in which the mechanically-operated oil pump is a source of the supply of the hydraulic pressure to the frictional engagement element, and a second state in which the electrically-operated oil pump is the source of the supply of the hydraulic pressure. The hydraulic pressure circuit is configured such that a discharge oil from the electrically-operated oil pump is drained from a predetermined drain portion when the selector valve is in the first state, and that less discharge oil is drained from the drain portion when the selector valve is in the second state, compared to when the selector valve is in the first state.

In this configuration, when the actuation of the electrically-operated oil pump starts in order to automatically shut down the engine, the selector valve is still located at the first state in which the hydraulic pressure is supplied, from the mechanically-operated oil pump, to the frictional engagement element (i.e., the frictional engagement starting element) which is to be engaged at the start of the vehicle. Thus, the discharge oil from the electrically-operated oil pump is drained from the drain portion. As a result, the discharge oil from the electrically-operated oil pump is prevented from being trapped, which therefore reduces an excessive load on the electrically-operated oil pump. This leads to reduced energy loss of the electrically-operated oil pump due to heat generation, and reduced degradation of the durability of the electrically-operated oil pump. In addition, in the case where the electrically-operated oil pump is of an automatic rotation control type, phenomena, such as step-outs, in which the rotation cannot be properly controlled, can be reduced.

On the other hand, while the engine is automatically shut down and the selector valve is in the second state in which the hydraulic pressure is supplied from the electrically-operated oil pump to the frictional engagement starting element, less discharge oil from the electrically-operated oil pump is drained from the drain portion, compared to while the selector valve is in the first state. Thus, the hydraulic pressure can be efficiently supplied from the electrically-operated oil pump to the frictional engagement starting element. As a result, an increase in the capacity, and hence the size, of the electrically-operated oil pump is prevented, which allows for reducing power consumption while the engine is automatically shut down. Particularly in the case of an automatic transmission in which the hydraulic pressure is supplied to a plurality of frictional engagement starting elements while the engine is automatically shut down, an increase in the capacity of the electrically-operated oil pump can be more efficiently prevented, and the hydraulic pressure can be efficiently supplied to the respective frictional engagement starting elements.

In the above-described hydraulic control unit for the automatic transmission, it is preferable: that the selector valve has a spool movable between a first position achieving the first state and a second position achieving the second state; that the spool is pushed toward the second position by the hydraulic pressure from the electrically-operated oil pump applied to an end of one side of the spool, and pushed toward the first position by the hydraulic pressure from the mechanically-operated oil pump applied to an end of the other side of the spool; and that a throttle is arranged on an oil path leading to the drain portion from the electrically-operated oil pump, the throttle restricting a drain amount from the drain portion while the selector valve is in the first state.

This means that the discharge pressure from the electrically-operated oil pump rises and exceeds the discharge pressure from the mechanically-operated oil pump, and is given to the end of one side of the spool of the selector valve, allowing the selector valve to be switched from the first state to the second state without the necessity to wait until the discharge pressure from the mechanically-operated oil pump drops due to an automatic shutdown of an engine. As a result, a drop of the hydraulic pressure supplied to the frictional engagement starting element while the selector valve is being switched can be reduced. This may enable the frictional engagement starting element to be suitably maintained in the engaged state or the ready-to-engage state.

Further, the throttle arranged on the oil path leading to the drain portion from the electrically-operated oil pump restricts a drain amount of the discharge oil from the electrically-operated oil pump, when the actuation of the electrically-operated oil pump starts while the selector valve is in the first state. As a result, the hydraulic pressure to be given, from the electrically-operated oil pump, to the end of one side of the spool of the selector valve when the electrically-operated oil pump is actuated while the selector valve is in the first state, rises promptly. This enables the selector valve to be switched more responsively.

In one embodiment of the above-described hydraulic control unit for the automatic transmission, the selector valve is arranged on an oil path leading to the drain portion from the electrically-operated oil pump, and the hydraulic pressure circuit is configured such that the oil path is open while the selector valve is in the first state, and that the oil path is blocked while the selector valve is in the second state, to drain less discharge oil from the drain portion, compared to while the selector valve is in the first state.

With this configuration, the oil path leading to the drain portion from the electrically-operated oil pump is blocked while the selector valve is in the second state. Thus, the energy for driving the electrically-operated oil pump can be efficiently used to supply the hydraulic pressure to the frictional engagement starting element while the engine is automatically shut down. This leads to effective prevention of an increase in the capacity of the electrically-operated oil pump.

In another embodiment of the above-described hydraulic control unit for the automatic transmission, the selector valve is arranged on an oil path leading to the drain portion from the electrically-operated oil pump, and the hydraulic pressure circuit is configured such that the oil path is open while the selector valve is in the first state, and that the oil path is open via a throttle which lowers, compared to while the selector valve is in the first state, a flow rate of the discharge oil flowing in the oil path while the selector valve is in the second state, to drain less discharge oil from the drain portion, compared to while the selector valve is in the first state.

With this configuration, the discharge oil from the electrically-operated oil pump is drained from the drain portion even when the selector valve is in the second state, similarly to when the selector valve is in the first state. When the selector valve is in the second state, however, a drain amount is reduced compared to when the selector valve is in the first state. This allows for supplying the hydraulic pressure efficiently to the frictional engagement starting element from the electrically-operated oil pump. In addition, peak oscillations of the hydraulic pressure caused in the electrically-operated oil pump can be lowered without an additional special mechanism, such as a relief valve, for releasing an excessive hydraulic pressure when oscillation of the hydraulic pressure occurs due to, for example, an increased viscosity of the discharge oil while the oil temperature is low. This prevents damage to the electrically-operated oil pump due to the peak oscillations of the hydraulic pressure, and breakage of a sealed portion on the hydraulic supply path starting from the electrically-operated oil pump and leading to the frictional engagement starting element, while efficiently supplying the hydraulic pressure from the electrically-operated oil pump to the frictional engagement starting element.

In the case, as described above, where the oil path is blocked or the oil path is open via the throttle when the selector valve is in the second state, it is preferable that: the hydraulic pressure circuit further includes an oil path starting from the electrically-operated oil pump, passing through the selector valve, and leading to the frictional engagement element; and that the selector valve is configured such that a period when the electrically-operated oil pump communicates with a portion downstream of the selector valve in the oil path leading to the drain portion from the electrically-operated oil pump, and a period when the electrically-operated oil pump communicates with a portion downstream of the selector valve in the oil path leading to the frictional engagement element from the electrically-operated oil pump, overlap each other while the selector valve is being switched between the first state and the second state.

With this configuration, the electrically-operated oil pump always communicates with at least one of the frictional engagement starting element or the drain portion while the selector valve is being switched. Thus, even while the selector valve is being switched, the discharge oil from the electrically-operated oil pump can be reliably prevented from being trapped, which leads to a reduced excessive load on the electrically-operated oil pump.

Advantages of the Invention

In this manner, the hydraulic control unit for the automatic transmission of the present invention allows for reducing an excessive load on the electrically-operated oil pump which is actuated while the engine is automatically shut down, and allows for efficiently supplying the hydraulic pressure from the electrically-operated oil pump to the frictional engagement element which is to be engaged at the vehicle's start. This may lead to prevention of an increase in the capacity, and hence the size, of the electrically-operated oil pump, and lead to a reduction in the power consumption while the engine is automatically shut down.

BRIEF DESCRIPTION OF THE DRAWINGS

FIG. 2 is a table showing a relationship between the combination of engagement of respective frictional engagement elements of the automatic transmission and the gear stage.

DESCRIPTION OF EMBODIMENTS

Embodiments of the present invention will be described in detail below based on the drawings.

Figure 1:
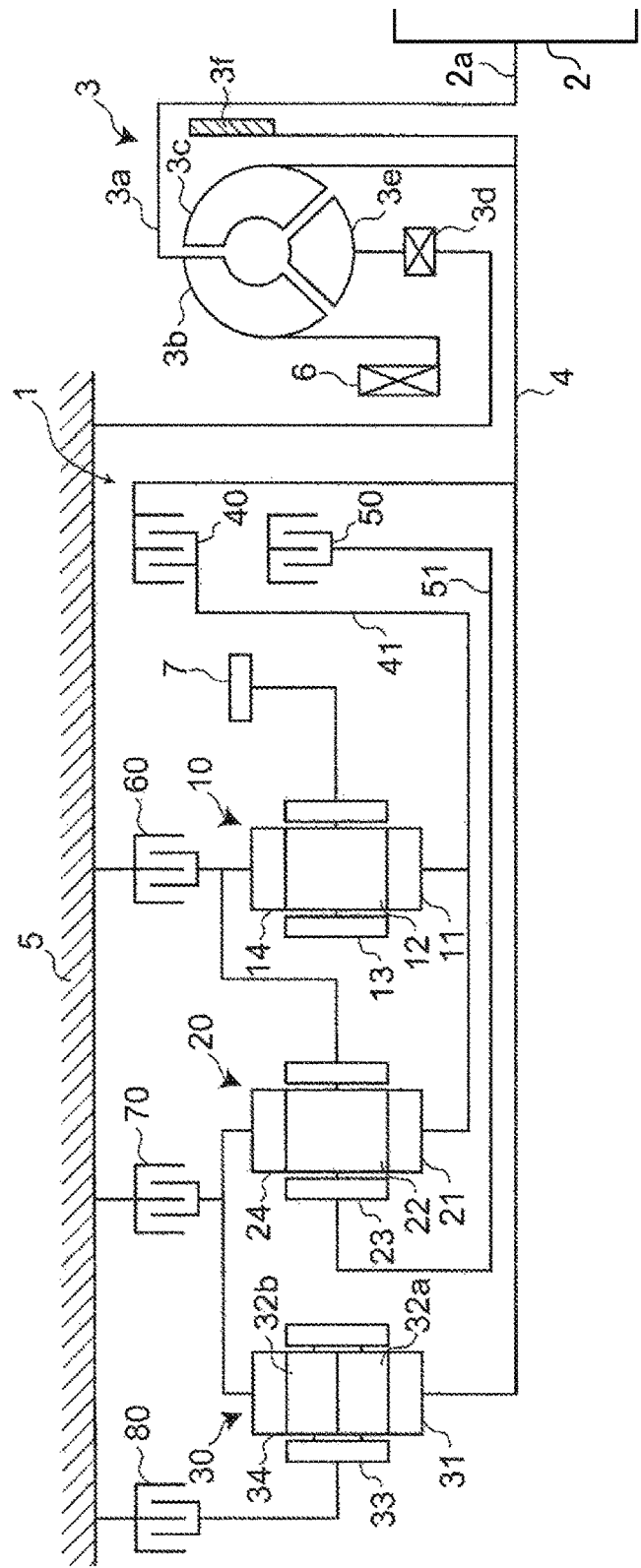
FIG. 1 is a skeleton diagram illustrating an automatic transmission.

As illustrated in FIG. 1, an automatic transmission 1 has an input shaft 4 coupled to an output shaft 2a of an engine 2 via a torque convertor 3. The automatic transmission 1 is mounted on a vehicle equipped with an idle stop system.

The torque convertor 3 has a case 3a coupled to the output shaft 2a of the engine 2 of the vehicle, a pump 3b fixed in the case 3a, a turbine 3c facing the pump 3b and driven by the pump 3b via hydraulic oil, a stator 3e interposed between the pump 3b and the turbine 3c, supported on a transmission case 5 via a one-way clutch 3d, and amplifying torque, and a lockup clutch 3f arranged between the case 3a and the turbine 3c to directly connect the output shaft 2a of the engine 2 and the turbine 3c via the case 3a. Thus, the rotation of the turbine 3c is transmitted to the automatic transmission 1 via the input shaft 4.

A mechanically-operated oil pump 6 (hereinafter referred to as a mechanical pump 6) which is driven by the engine 2 via the torque convertor 3 is arranged between the automatic transmission 1 and the torque convertor 3. While the engine 2 is driven, the mechanical pump 6 feeds the hydraulic pressure to the hydraulic pressure circuits used to control the automatic transmission 1 and the torque convertor 3.

Provided on the input shaft 4 of the automatic transmission 1 are, from the drive source side (from the engine 2 side), a first planetary gear set 10 (hereinafter referred to as a first gear set 10), a second planetary gear set 20 (hereinafter referred to as a second gear set 20) and a third planetary gear set (hereinafter referred to as a third gear set 30).

Also provided on the input shaft 4, as frictional engagement elements for switching between power transmission paths comprised of the first, second and third gear sets 10, 20, 30, are a low clutch 40, a high clutch 50, an LR (low/reverse) brake 60, a 26 brake 70 and an R35 brake 80. The high clutch 50 is arranged radially inside the low clutch 40. The LR brake 60, the 26 brake 70 and the R35 brake 80 are disposed opposite to the drive source with respect to the low and high clutches 40, 50 and sequentially arranged along the axial direction of the input shaft 4 from the drive source side.

The first and second gear sets 10, 20 are planetary gear sets of a single pinion type. The first gear set 10 is comprised of a sun gear 11, a plurality of pinions 12 engaged with the sun gear 11, a carrier 13 that supports the plurality of pinions 12, and a ring gear 14 engaged with the plurality of pinions 12. The second gear set 20 is comprised of a sun gear 21, a plurality of pinions 22 engaged with the sun gear 21, a carrier 23 that supports the plurality of pinions 22, and a ring gear 24 engaged with the plurality of pinions 22.

The third gear set 30 is a planetary gear set of a double pinion type. The third gear set 30 is comprised of a sun gear 31, a plurality of first pinions 32a engaged with the sun gear 31, a plurality of second pinions 32b each engaged with an associated one of the plurality of first pinions 32a, a carrier 33 that supports the pinions 32a, 32b, and a ring gear 34 engaged with the plurality of second pinions 32b.

The input shaft 4 is directly coupled to the sun gear 31 of the third gear set 30. The sun gear 11 of the first gear set 10 and the sun gear 21 of the second gear set 20 are coupled to each other, and are connected to an output member 41 of the low clutch 40. An output member 51 of the high clutch 50 is coupled to the carrier 23 of the second gear set 20.

The ring gear 14 of the first gear set 10 and the carrier 23 of the second gear set 20 are coupled to each other, and are connected to the transmission case 5 via the LR brake 60 such that they can be disconnected from the transmission case 5. The ring gear 24 of the second gear set 20 and the ring gear 34 of the third gear set 30 are coupled to each other, and are connected to the transmission case 5 via the 26 brake 70 such that they can be disconnected from the transmission case 5. The carrier 33 of the third gear set 30 is connected to the transmission case 5 via the R35 brake 80 such that it can be disconnected from the transmission case 5. An output gear 7 that outputs an output of the automatic transmission 1 to the drive wheels (not shown) is coupled to the carrier 13 of the first gear set 10.

In the above described automatic transmission 1, the combination of engagement among the low clutch 40, the high clutch 50, the LR brake 60, the 26 brake 70 and the R35 brake 80 determines the first to sixth gears in the D-range and the reverse gear in the R-range, as shown in the engagement table in FIG. 2. In the engagement table in FIG. 2, the circle indicates that the associated frictional engagement element is engaged, and the blank space indicates that the frictional engagement element is disengaged (or released).

The automatic transmission 1 is equipped with a hydraulic control unit for achieving the above-described gear stage by selectively supplying line pressure for the engagement to the low clutch 40, the high clutch 50, the LR brake 60, the 26 brake 70 and the R35 brake 80. This hydraulic control unit controls the gear change of the automatic transmission 1.

Further, as described earlier, the automatic transmission 1 is mounted on a vehicle equipped with an idle stop system. This idle stop system carries out idle stop control in which it automatically shuts down the engine 2 of the vehicle when predetermined shutdown conditions are met while the vehicle stops, and automatically restarts the engine 2 when predetermined restart conditions are met while the engine 2 is automatically shut down. Note that the execution of the idle stop control may be prohibited by a manual operation by the driver of the vehicle.

While the engine 2 is automatically shut down due to the idle stop control, the hydraulic pressure continues to be supplied to the low clutch 40 and the LR brake 60, which are frictional engagement elements to be engaged at the start of the vehicle (i.e., frictional engagement elements to be engaged in the first gear), so that the engaged state or the ready-to-engage state of these low clutch 40 and the LR brake 60 are maintained. This allows the vehicle to start promptly when the engine 2 restarts in response to the starting operation by the driver of the vehicle.

Examples of the ready-to-engage state include bringing the low clutch 40 and the LR brake 60 into a slip state, and in the case where the low clutch 40 and the LR brake 60 are frictional engagement elements of double-piston type having an engagement piston and a clearance adjustment piston, bringing them into a state in which the hydraulic pressure is supplied only to a hydraulic pressure chamber for the clearance adjustment piston. In the double-piston type frictional engagement elements, the hydraulic pressure is supplied only to the hydraulic pressure chamber for the clearance adjustment piston before the engagement piston establishes the engaged state, thereby bringing a plurality of friction plates of the frictional engagement elements closer to one another (i.e., bringing the frictional engagement elements into the ready-to-engage state) by the clearance adjustment piston. From this state, the engagement state can be established more quickly than it is established by the engagement piston.

Now, with respect to the hydraulic control unit for the automatic transmission 1, configurations of a hydraulic pressure circuit for controlling the supply of the hydraulic pressure to the low clutch 40 and the LR brake 60 to be engaged when the vehicle starts will be separately described in the following embodiments.

First Embodiment

A configuration of a hydraulic pressure circuit 100 according to a first embodiment will be described with reference to FIGS. 3-5.

Figure 3:
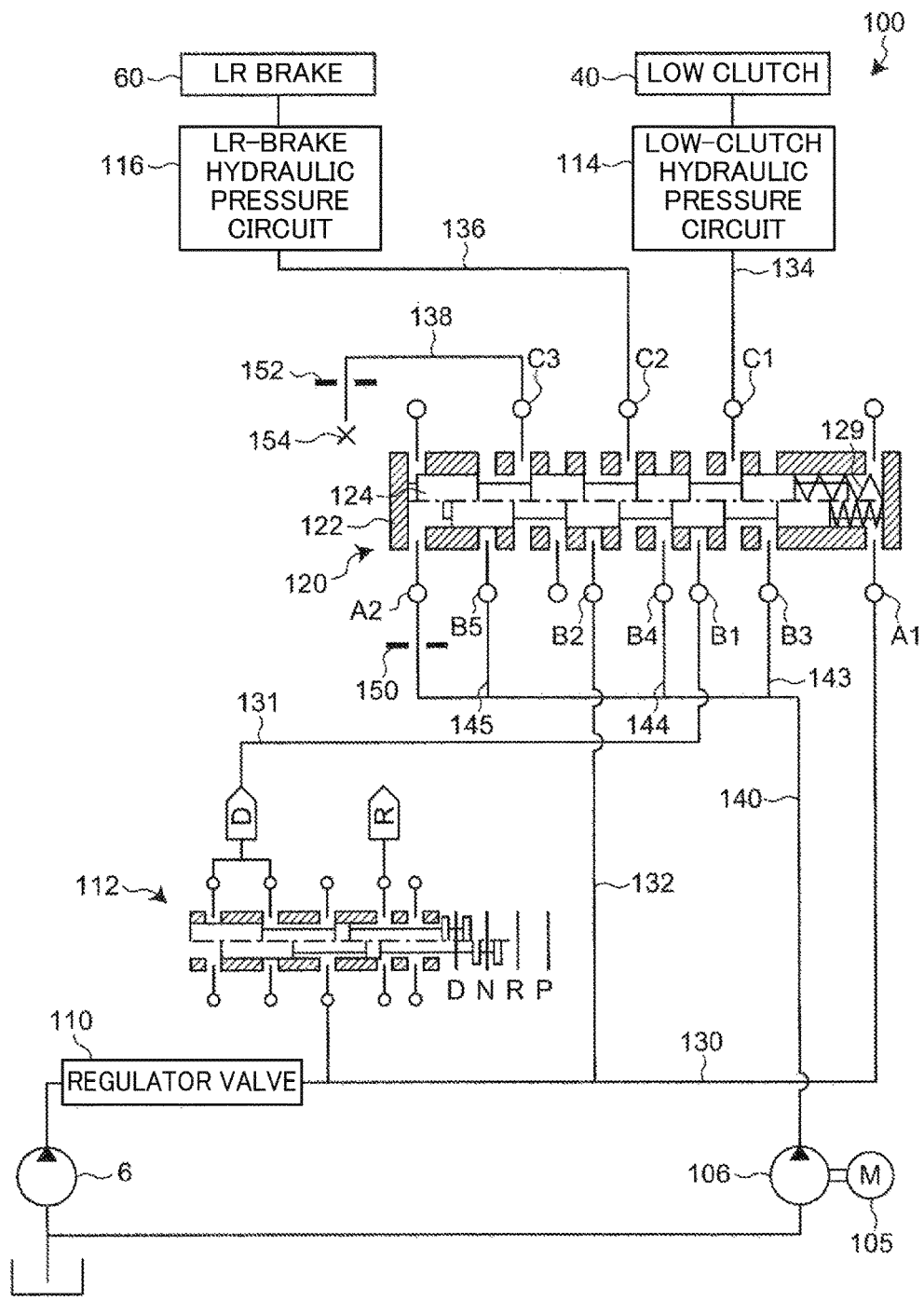
FIG. 3 is a circuit diagram of a hydraulic pressure circuit of a first embodiment. The hydraulic pressure circuit controls supply of the hydraulic pressure to a low clutch and an LR brake of the automatic transmission.

FIG. 3 illustrates a circuit diagram of the hydraulic pressure circuit 100 according to the first embodiment. The hydraulic pressure circuit 100 controls the hydraulic pressure supply to the low clutch 40 and the LR brake 60.

As illustrated in FIG. 3, an electrically-operated oil pump 106 (hereinafter referred to as the electric pump 106) driven by an electric motor 105 to generate hydraulic pressure while the engine 2 is shut down, and the mechanical pump 6 driven by the engine 2 to generate hydraulic pressure are provided as hydraulic pressure supply sources for supplying the hydraulic pressure to the hydraulic pressure circuit 100.

The hydraulic pressure circuit 100 includes a regulator valve 110 which adjusts the discharge pressure of the mechanical pump 6 to a predetermined line pressure, a first main line 130 to which the line pressure is supplied through the regulator valve 110, a second main line 140 to which the hydraulic pressure generated by the electric pump 106 is supplied, a manual valve 112 operated by range selection operation by the driver of the vehicle, and a selector valve 120 switchable between a first state in which the mechanical pump 6 is the supply source of the hydraulic pressure to the low clutch 40 and the LR brake 60, and a second state in which the electric pump 106 is the supply source of the hydraulic pressure.

The selector valve 120 has first and second control ports A1, A2, first to fifth input ports B1, B2, B3, B4, B5, and a low-clutch output port C1, an LR-brake output port C2, and a drain output port C3.

The selector valve 120 also has a spool 124 movable in its axial direction according to the hydraulic pressure that is input to the first and second control ports A1, A2, a sleeve 122 housing the spool 124, and a return spring 129 made of a compressed coil spring and disposed in the sleeve 122 to bias the spool 124.

The spool 124 is movable in the sleeve 122 along the axial direction (i.e., the lateral direction of FIG. 3) of the spool 124 between a first position at which the spool 124 is brought into contact with an end wall portion on one side of the sleeve 122 (i.e., the end wall portion on the left side of FIG. 3) and a second position at which the spool 124 is brought into contact with an end wall portion on the other side of the sleeve 122 (i.e., the end wall portion on the right side of FIG. 3).

The return spring 129 is disposed in the sleeve 122 at the end of the other side of the sleeve 122, and is compressed by the spool 124 moving from the first position to the second position. The spool 124 is biased from the second position side toward the first position side by the restoring force of the compressed return spring 129. The end of the spool 124 closer to the other side has a smaller diameter than the return spring 129, and hence can pass through the return spring 129. This allows the end face of the spool 124 closer to the other side to come into contact with the end wall portion on the other side of the sleeve 122 at the second position of the spool 124.

The first control port A1 is provided at the end of the selector valve 120 closer to the other side, and the second control port A2 is provided at the end of the selector valve 120 closer to the one side. The first main line 130 is connected to the first control port A1, to which the line pressure from the mechanical pump 6 (more precisely, the regulator valve 110) driven by the engine 2 is input through the first main line 130. The second main line 140 is connected to the second control port A2, to which the hydraulic pressure (i.e., discharge oil) from the electric pump 106 activated by being driven by the electric motor 105 is input through the second main line 140. Thus, the hydraulic pressure from the electric pump 106 is given to the end of the spool 124 closer to the one side, and pushes the spool 124 toward the second position. The line pressure from the mechanical pump 6 is given to the end of the spool 124 closer to the other side, and pushes the spool 124 toward the first position.

An orifice 150 is provided at an downstream end of the second main line 140. The discharge oil from the electric pump 106 is supplied to the second control port A2, with its flow rate restricted by this orifice 150.

First to fifth input lines 131, 132, 143, 144, 145 are connected to the first to fifth input ports B1, B2, B3, B4, B5, respectively.

When the D-range is selected during the operation of the engine 2, D-range pressure is supplied to the first input line 131 from the mechanical pump 6 through the regulator valve 110 and the manual valve 112. The D-range pressure is input to the first input port B1 through the first input line 131. The second input line 132 branches from the first main line 130. Through this second input line 132, the line pressure is input to the second input port B2 during the operation of the engine 2.

The third, fourth and fifth input lines 143, 144, 145 branch from the second main line 140 in parallel with each other. Thus, the hydraulic pressure supplied from the electric pump 106 to the second main line 140 is input to the third input port B3 through the third input line 143, to the fourth input port B4 through the fourth input line 144, and to the fifth input port B5 through the fifth input line 145.

A low-clutch line 134 for supplying the hydraulic pressure to the low clutch 40 through a low-clutch hydraulic pressure circuit 114 is connected to the low-clutch output port C1. An LR-brake line 136 for supplying the hydraulic pressure to the LR brake 60 through an LR-brake hydraulic pressure circuit 116 is connected to the LR-brake output port C2.

The low-clutch hydraulic pressure circuit 114 and the LR-brake hydraulic pressure circuit 116 may have any configurations, but each of the hydraulic pressure circuits 114, 116 is equipped, for example, with a hydraulic pressure control valve made of, e.g., a solenoid valve, a selector valve made of a spool valve, a hydraulic pressure switch, and other suitable elements as necessary.

Note that in the case where a double-piston type frictional engagement element having an engagement piston and a clearance adjustment piston is used as the LR brake 60 or the low clutch 40, the LR-brake hydraulic pressure circuit 116 or the low-clutch hydraulic pressure circuit 114 is configured to be able to supply the hydraulic pressure to the hydraulic pressure chamber for the engagement piston and the hydraulic pressure chamber for the clearance adjustment piston, independently from each other.

A drain line 138 connected to a predetermined drain portion 154 is connected to the drain output port C3. As will be described later, the drain line 138 is for draining part of the discharge oil from the electric pump 106 through the drain portion 154. An orifice 152 is provided on this drain line 138. The orifice 152 restricts the flow rate of the discharge oil from the electric pump 106 flowing through the drain line 138 to a predetermined value. The orifice 152 serves as a throttle that restricts the drain amount from the drain portion 154 while the selector valve 120 is in the first state.

The line pressure from the mechanical pump 6 that is input to the first control port A1 is given to the end of the spool 124 closer to the other end, and hence the spool 124 is pushed toward the first position (to the left side of FIG. 3). On the other hand, the hydraulic pressure from the electric pump 106 that is input to the second control port A2 is given to the end of the spool 124 closer to the one end, and hence the spool 124 is pushed toward the second position (to the right side of FIG. 3). Further, the spool 124 is biased toward the first position by the elastic force of the return spring 129.

If the predetermined shutdown conditions are not met or idle stop control is not carried out while the vehicle stops, the engine 2 is prevented from being automatically shut down, and the electric pump 106 is in a stopped state. In this state, the line pressure from the mechanical pump 6 is input to the first control port A1, and the hydraulic pressure from the electric pump 106 is not input to the second control port A2. Thus, in this state, the spool 124 is located at the first position by the exertion of the pushing force of the pressure (i.e., the line pressure) input to the first control port A1 and the biasing force caused by the elastic force of the return spring 129.

Figure 4:
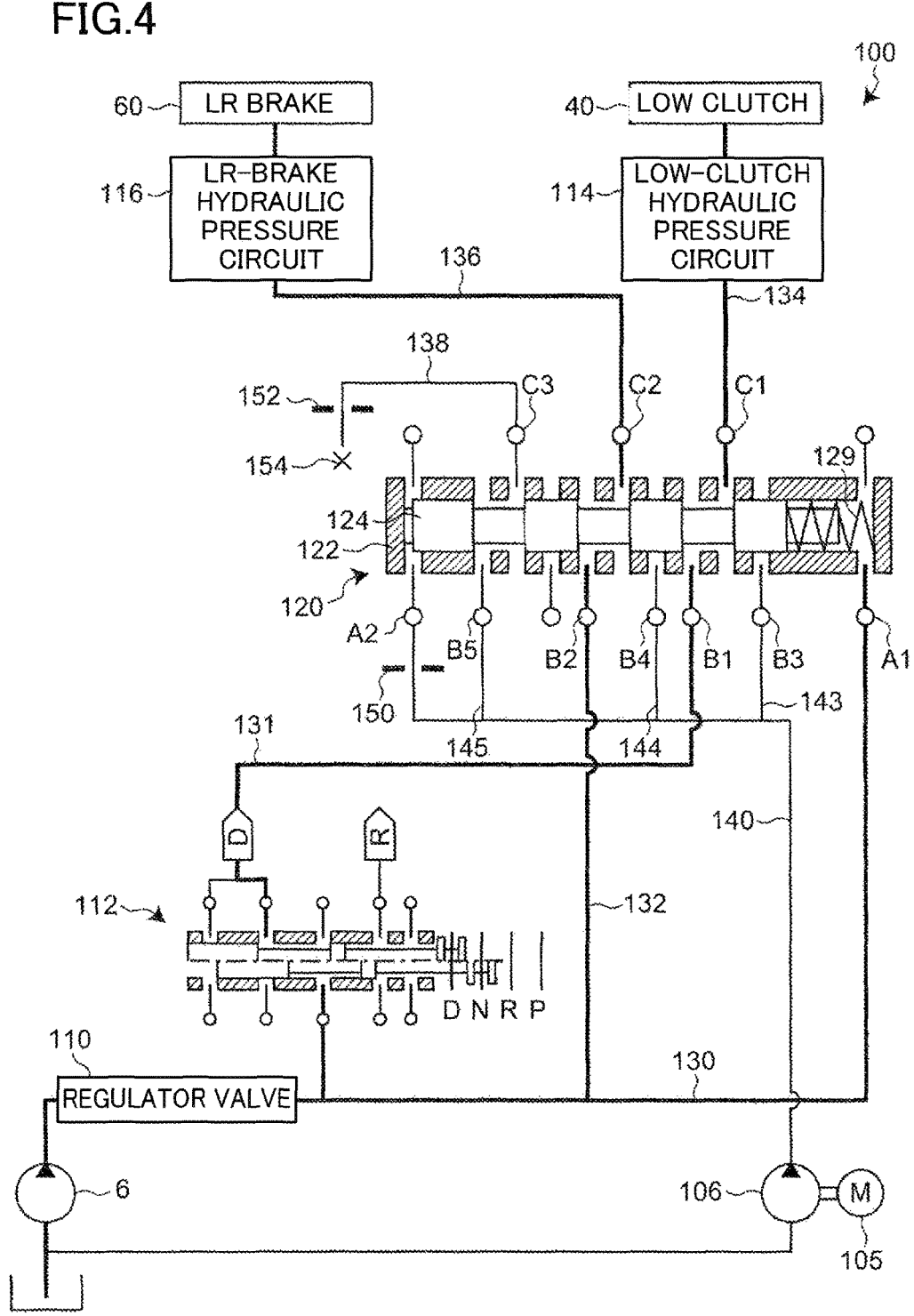
FIG. 4 is a circuit diagram showing supply of the hydraulic pressure at the first gear position while the engine is driven, in the hydraulic pressure circuit shown in FIG. 3.

As illustrated in FIG. 4, when the spool 124 is located at the first position, the low-clutch output port C1 communicates with the first input port B1, and the LR-brake output port C2 communicates with the second input port B2. This allows the D-range pressure that is input to the first input port B1 to be supplied to the low-clutch line 134, and the line pressure that is input to the second input port B2 to be supplied to the LR-brake line 136. The first state, in which the mechanical pump 6 is the source of supply of the hydraulic pressure to the low clutch 40 and the LR brake 60, is achieved in this manner.

On the other hand, if the predetermined shutdown conditions are met while the vehicle stops, the engine 2 is automatically shut down and the electric pump 106 is driven by the electric motor 105. This causes the electric pump 106 to operate, and the hydraulic pressure from the electric pump 106 is input to the second control port A2. When the discharge pressure of the electric pump 106 rises to, and exceeds, a predetermined value, and the pushing force of the hydraulic pressure that is input to the second control port A2 exceeds a resultant force of the pushing force of the line pressure input to the first control port A1 and the biasing force caused by the elastic force of the return spring 129, the spool 124 moves toward the second position from the first position.

In this process, the drive of the electric pump 106 is started before the engine 2 is automatically shut down so that the discharge pressure of the electric pump 106 rises to a sufficient level before the discharge pressure of the mechanical pump 6 drops. This allows for switching the supply source of the hydraulic pressure from the mechanical pump 6 to the electric pump 106, while decreasing a reduction in the hydraulic pressure to be supplied to the low clutch 40 and the LR brake 60. As a result, the low clutch 40 and the LR brake 60 can maintain satisfactory engaged state or ready-to-engage state.

Figure 5:
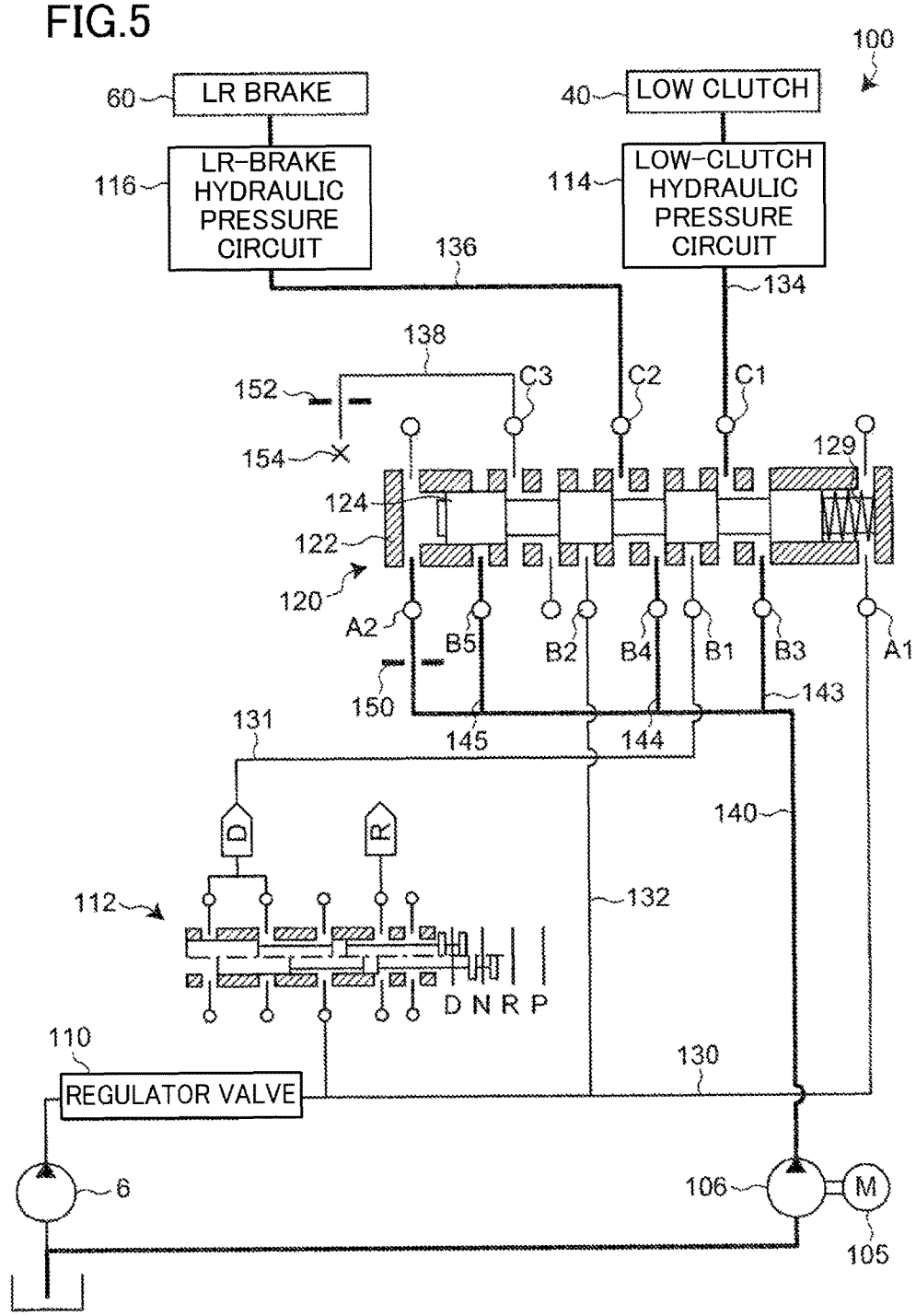
FIG. 5 is a circuit diagram showing supply of the hydraulic pressure by the electrically-operated oil pump while the engine is automatically shut down, in the hydraulic pressure circuit shown in FIG. 3.

As illustrated in FIG. 5, when the spool 124 is located at the second position, the low-clutch output port C1 communicates with the third input port B3, and the LR-brake output port C2 communicates with the fourth input port B4. This allows the hydraulic pressure from the electric pump 106 which is input to the third input port B3 to be supplied to the low-clutch line 134, and the hydraulic pressure from the electric pump 106 which is input to the fourth input port B4 to be supplied to the LR-brake line 136. The second state, in which the electric pump 106 is the supply source of the hydraulic pressure to the low clutch 40 and the LR brake 60, is achieved in this manner.

When predetermined restart conditions are met while the engine 2 is automatically shut down, the engine 2 restarts, and the drive of the electric pump 106 is stopped. When the resultant force of the pushing force of the line pressure that is input to the first control port A1 and the biasing force caused by the elastic force of the return spring 129 exceeds the pushing force of the hydraulic pressure from the electric pump 106 which is input to the second control port A2, the spool 124 returns to the first position from the second position, and the state of the selector valve 120 returns to the first state.

In this manner, the spool 124 travels between the first and second positions according to the operational states of the engine 2 and the electric pump 106. As a result, the state of the selector valve 120 is switched between the first state and the second state.

As illustrated in FIG. 4, when the selector valve 120 is in the first state, the third and fourth input ports B3, B4 of the third, fourth and fifth input ports B3, B4, B5, to which the hydraulic pressure from the electric pump 106 is input, are closed by the spool 124, and hence respective oil paths leading to the low clutch 40 and the LR brake 60 from the electric pump 106 are blocked by the selector valve 120.

On the other hand, the fifth input port B5 communicates with the drain output port C3, which means that the oil path leading to the drain portion 154 from the electric pump 106, that is, the path sequentially connecting the second main line 140, the fifth input line 145 and the drain line 138, is open.

This configuration allows part of the discharge oil from the electric pump 106 to be drained from the drain portion 154 when the electric pump 106 is activated while the selector valve 120 is in the first state. As a result, the discharge oil from the electric pump 106 is prevented from being trapped in the second main line 140 by the selector valve 120 while the selector valve 120 is in the first state. This can reduce an excessive load applied to the electric motor 105 that drives the electric pump 106, and lead to reduced energy loss of the electric pump 106 caused by heat generation, and reduced degradation of the durability of the electric pump 106. Further, if the electric pump 106 is of an automatic rotation control type, phenomena, such as step-outs, in which the rotation cannot be properly controlled, can be reduced.

Further, the orifice 152 provided on the drain line 138 restricts the drain amount of the discharge oil from the electric pump 106 to the predetermined value when the activation of the electric pump 106 starts while the selector valve 120 is in the first state. This may enable an immediate rise of the hydraulic pressure to be given to the second control port A2 from the electric pump 106 when the electric pump 106 is actuated while the selector valve 120 is in the first state. Thus, the selector valve 120 can be switched from the first state to the second state more responsively.

On the other hand, as illustrated in FIG. 5, when the selector valve 120 is in the second state, the fifth input port B5 is closed by the spool 124, and hence the oil path leading to the drain portion 154 from the electric pump 106 is completely blocked. By this blockage, the discharge oil from the electric pump 106 is less drained from the drain portion 154, compared to when the selector valve 120 is in the first state. As a result, the hydraulic pressure can be efficiently supplied to the low clutch 40 and the LR brake 60 from the electric pump 106, which leads to prevention of an increase in the capacity of the electric pump 106. Thus, the electric pump 106 is prevented from increasing in size, which allows for reducing power consumption while the engine 2 is automatically shut down.

Note that an electric pump unit equipped with a relief valve which releases excessive hydraulic pressure when oscillation of the hydraulic pressure occurs due to, for example, an increased viscosity of the discharge oil while the oil temperature is low, may be used as the electric pump 106. In this case, the excessive hydraulic pressure discharged from the electric pump 106 is drained via the relief valve, even when the selector valve 120 is in the second state in which the oil path leading to the drain portion 154 from the electric pump 106 is blocked as illustrated in FIG. 5. This can lower peak oscillations of the hydraulic pressure caused in the electric pump 106. As a result, damage to the electric pump 106 due to the peak oscillations of the hydraulic pressure, and breakage of sealed portions on the low-clutch line 134, the LR-brake line 136 and other elements may be prevented.

Second Embodiment

A configuration of a hydraulic pressure circuit 200 according to a second embodiment will be described with reference to FIGS. 6 and 7. The hydraulic pressure circuit 200 is provided with, instead of the selector valve 120 in the hydraulic pressure circuit 100 of the first embodiment, a selector valve 220 switchable between the first state and the second state, similarly to the selector valve 120.

Figure 6:
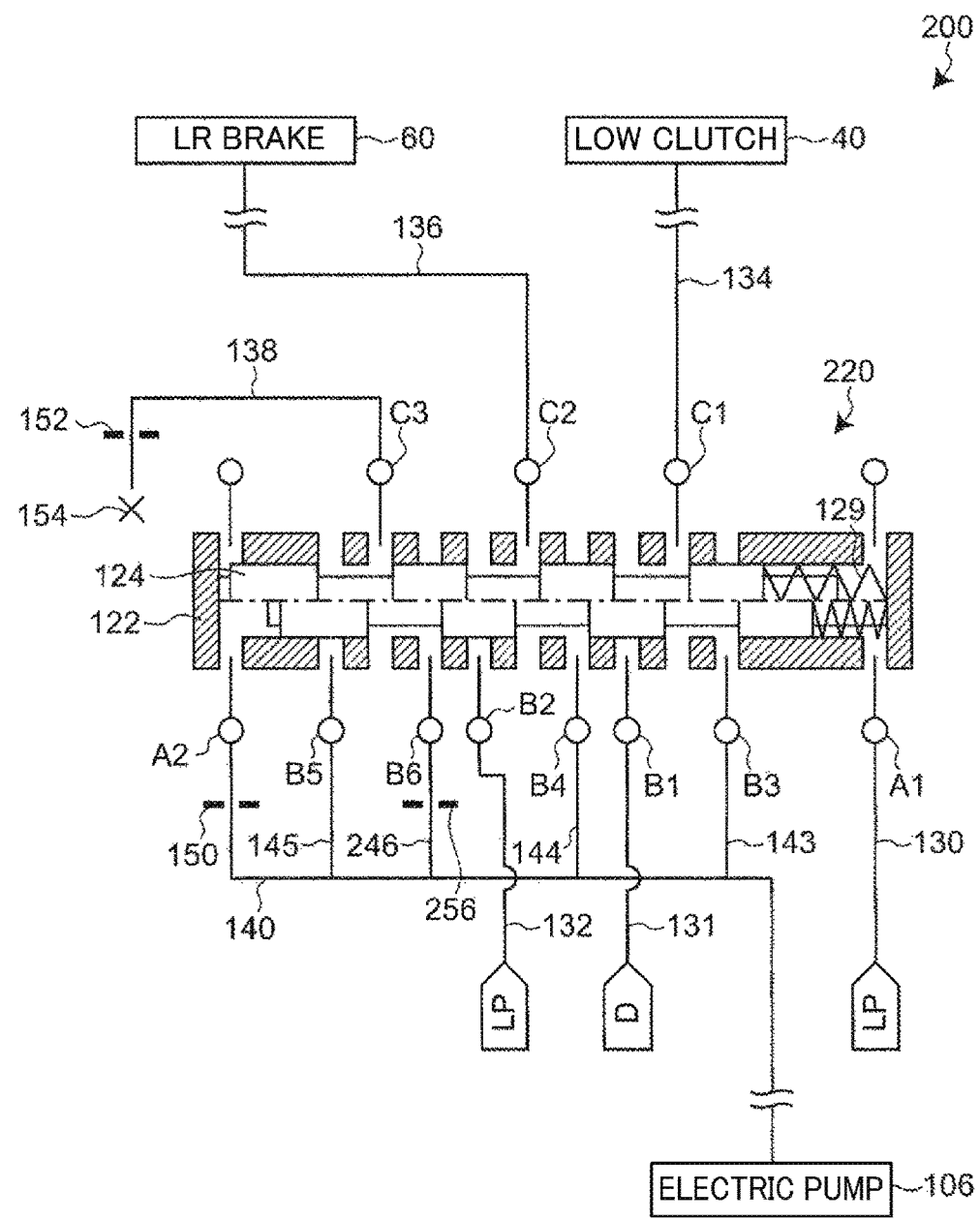
FIG. 6 is a circuit diagram of a hydraulic pressure circuit of a second embodiment. The hydraulic pressure circuit controls supply of the hydraulic pressure to the low clutch and the LR brake.
Figure 7:
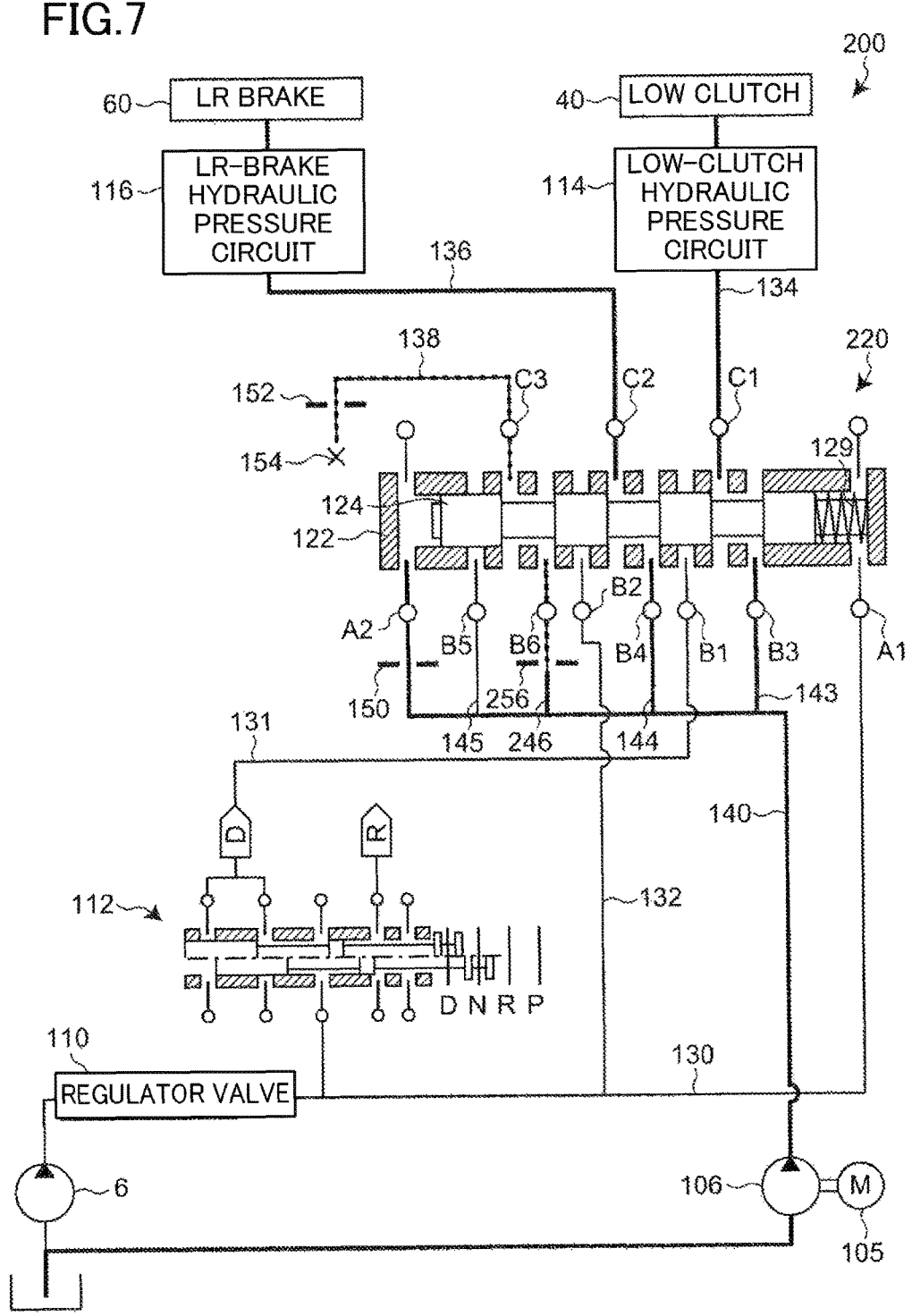
FIG. 7 is a circuit diagram showing a state of supply of the hydraulic pressure by the electrically-operated oil pump while the engine is automatically shut down, in the hydraulic pressure circuit shown in FIG. 6.

FIGS. 6 and 7 illustrate circuit diagrams of the hydraulic pressure circuit 200 according to the second embodiment. The hydraulic pressure circuit 200 controls the supply of the hydraulic pressure to the low clutch 40 and the LR brake 60. FIG. 6 is an enlarged view of the selector valve 220 in the hydraulic pressure circuit 200 and its peripheral elements. FIG. 7 shows the selector valve 220 in the second state.

Note that in the hydraulic pressure circuit 200 of the second embodiment, explanation of the same elements as those in the hydraulic pressure circuit 100 of the first embodiment will be omitted, and the same reference characters are used to designate such elements in FIGS. 6 and 7, or the designations are omitted.

As illustrated in FIG. 6, the selector valve 220 has an additional sixth input port B6 which is not provided at the selector valve 120 of the first embodiment. The other configurations of the selector valve 220 are the same as those of the selector valve 120 of the first embodiment. Also similarly to the first embodiment, the spool 124 moves between the first position (i.e., the position at which the spool 124 is brought into contact with the end wall portion of the sleeve 122 on the left side of FIG. 6) and the second position (i.e., the position at which the spool 124 is brought into contact with the end wall portion of the sleeve 122 on the right side of FIG. 6) according to the hydraulic pressure input to the first control port A1 and the second control port A2, thereby switching the selector valve 220 between the first state and the second state.

A sixth input line 246 which branches from the second main line 140 in parallel with the third to fifth input lines B3, B4, B5 is connected to the sixth input port B6. The sixth input line 246 is provided with an orifice 256.

While the selector valve 220 is in the first state, the sixth input port B6 is closed by the spool 124, and whether the first to fifth input ports B1, B2, B3, B4, B5 are closed or opened is the same as those of the selector valve 120 of the first embodiment. Thus, during the operation of the mechanical pump 6, the state of supplying the hydraulic pressure is the same as in the first embodiment until the discharge pressure of the electric pump 106 is raised to, or exceeds, a predetermined value. That is, while the selector valve 220 is in the first state, the oil path leading to the drain portion 154 from the electric pump 106 (i.e., the path sequentially connecting the second main line 140, the fifth input line 145 and the drain line 138) is open similarly to the first embodiment, and hence, part of the discharge oil from the electric pump 106 is drained from the drain portion 154.

Thus, in the second embodiment, the discharge oil from the electric pump 106 is prevented from being trapped in the second main line 140 by the selector valve 220 when the electric pump 106 is actuated while the selector valve 220 is in the first state, similarly to the first embodiment. This can reduce an excessive load applied to the electric motor 105 that drives the electric pump 106. Further, similarly to the first embodiment, the orifice 152 provided on the drain line 138 restricts the drain amount of the discharge oil from the electric pump 106 to the predetermined value. This may enable an immediate rise of the hydraulic pressure to be given to the second control port A2 from the electric pump 106 when the electric pump 106 is actuated while the selector valve 220 is in the first state. Thus, the selector valve 220 can be switched from the first state to the second state more responsively.

On the other hand, as illustrated in FIG. 7, when the selector valve 220 is in the second state, the sixth input port B6 communicates with the drain output port C3, and hence the oil path sequentially passing through the second main line 140, the sixth input line 246 and the drain line 138 from the electric pump 106, and leading to the drain portion 154 is open. That is, unlike the first embodiment in which the oil path leading to the drain portion 154 from the electric pump 106 is completely blocked, the oil path leading to the drain portion 154 from the electric pump 106 is open while the selector valve 220 is in the second state, similarly to when the selector valve 220 is in the first state. However, the oil path leading to the drain portion 154 from the electric pump 106 while the selector valve 220 is in the second state is different from the oil path that is open while the selector valve 220 is in the first state.

While the selector valve 220 is in the second state, the flow rate of the discharge oil supplied from the electric pump 106 to the sixth input line 246 via the second main line 140 is restricted by the orifice 256, and the discharge oil is supplied to the sixth input port B6 at this restricted flow rate. Thus, while the selector valve 220 is in the second state, the oil flow in the oil path leading to the drain portion 154 from the electric pump 106 passes through the two orifices 152, 256. Thus, less discharge oil is drained from the drain portion 154 (i.e., the draining of the discharge oil from the drain portion 154 is reduced), compared to while the selector valve 220 is in the first state. In this manner, while the selector valve 220 is in the second state, the oil path leading to the drain portion 154 from the electric pump 106 is open via the throttle (i.e., the orifice 256) which reduces the flow rate of the oil, compared to while the selector valve 220 is in the first state, thereby draining less discharge oil from the drain portion 154 compared to while the selector valve 220 is in the first state.

Thus, in the second embodiment, the oil path leading to the drain portion 154 from the electric pump 106 is open while the selector valve 220 is in the second state, but with a reduced amount of draining from the drain portion 154 (i.e., less discharge oil from the electric pump 106 is drained from the drain portion 154) compared to while selector valve 220 is in the first state. This allows for efficient supply of the hydraulic pressure to the low clutch 40 and the LR brake 60 from the electric pump 106, which may lead to prevention of an increase in the capacity of the electric pump 106. Thus, the electric pump 106 may be prevented from increasing in size, which allows for reducing power consumption while the engine 2 is automatically shut down.

Further, since the oil path leading to the drain portion 154 from the electric pump 106 is open while the selector valve 220 is in the second state, peak oscillations of the hydraulic pressure caused in the electric pump 106 can be lowered without using, as the electric pump 106, such an electric pump unit equipped with a relief valve which was described in the first embodiment. As a result, damage to the electric pump 106 due to the peak oscillations of the hydraulic pressure, and breakage of sealed portions on the low-clutch line 134, the LR-brake line 136 and other elements may be prevented.

Note that in the second embodiment, too, such an electric pump unit equipped with a relief valve which was described in the first embodiment may be used as the electric pump 106.

Third Embodiment

A configuration of a hydraulic pressure circuit 300 according to a third embodiment will be described with reference to FIGS. 8 and 9. The hydraulic pressure circuit 300 is provided with, instead of the selector valve 120 in the hydraulic pressure circuit 100 of the first embodiment, a selector valve 320 switchable between the first state and the second state, similarly to the selector valve 120.

Figure 8:
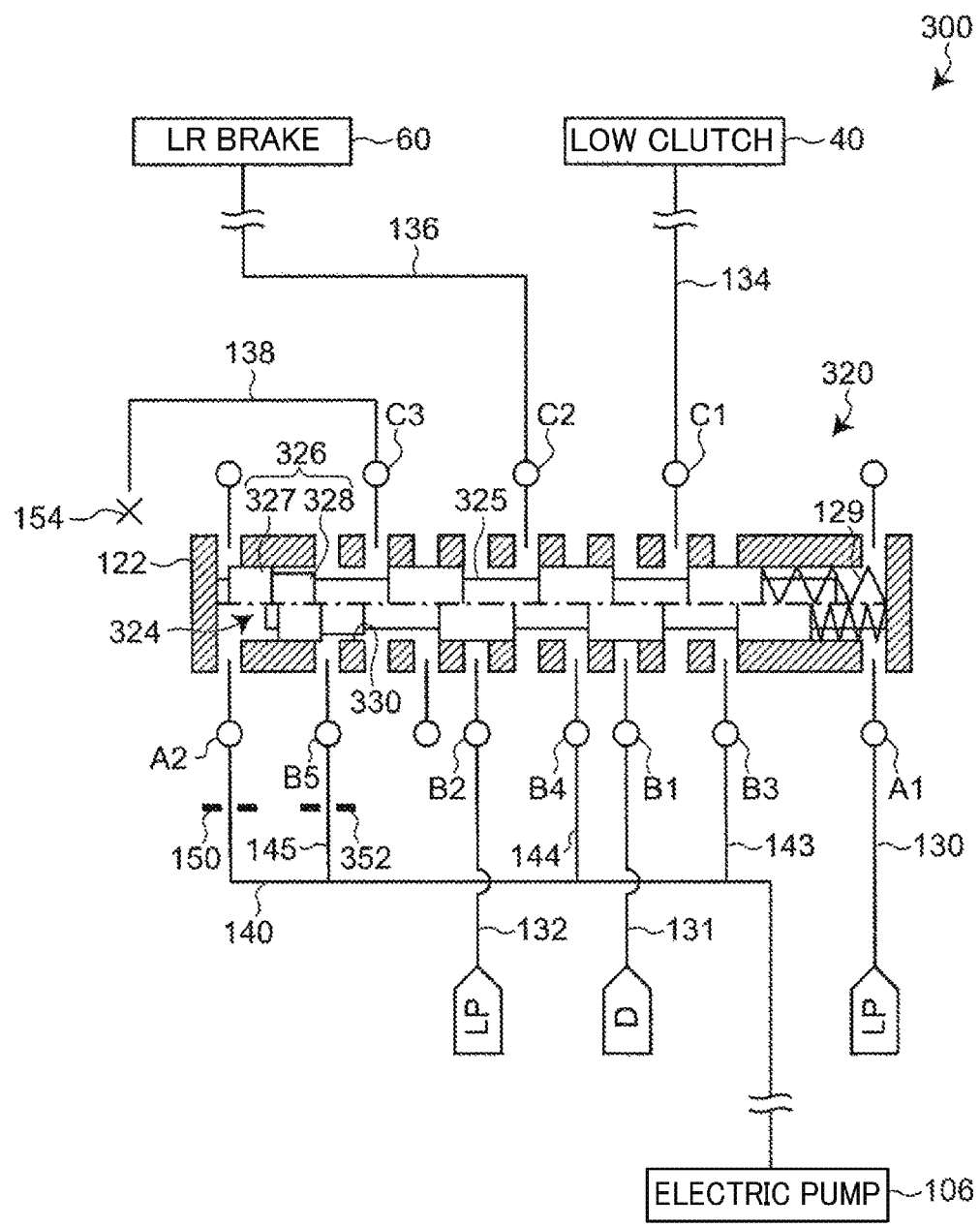
FIG. 8 is a circuit diagram of a hydraulic pressure circuit of a third embodiment. The hydraulic pressure circuit controls supply of the hydraulic pressure to the low clutch and the LR brake.
Figure 9:
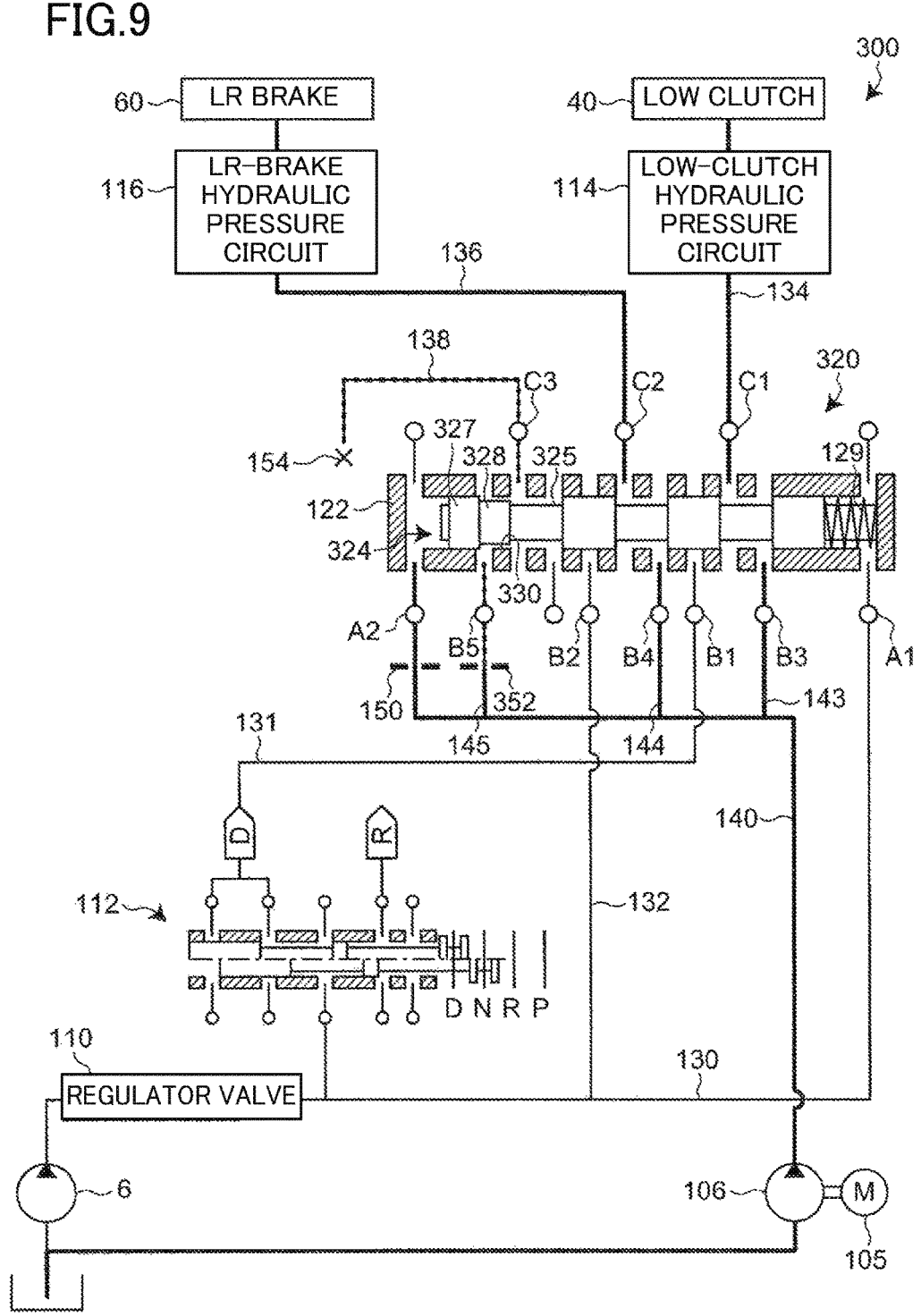
FIG. 9 is a circuit diagram showing a state of supply of the hydraulic pressure by the electrically-operated oil pump while the engine is automatically shut down, in the hydraulic pressure circuit shown in FIG. 8.

FIGS. 8 and 9 illustrate circuit diagrams of the hydraulic pressure circuit 300 according to the third embodiment. The hydraulic pressure circuit 300 controls the supply of the hydraulic pressure to the low clutch 40 and the LR brake 60. FIG. 8 is an enlarged view of the selector valve 320 in the hydraulic pressure circuit 300 and its peripheral elements. FIG. 9 shows the selector valve 320 in the second state.

Note that in the hydraulic pressure circuit 300 of the third embodiment, explanation of the same elements as those in the hydraulic pressure circuit 100 of the first embodiment will be omitted, and the same reference characters are used to designate such elements in FIGS. 8 and 9, or the designations are omitted.

As illustrated in FIG. 8, the selector valve 320 has the same or similar configuration as the selector valve 120 of the first embodiment, except a spool 324. Similarly to the first embodiment, the spool 324 moves between the first position (i.e., the position at which the spool 324 is brought into contact with the end wall portion of the sleeve 122 on the left side of FIG. 8) and the second position (i.e., the position at which the spool 324 is brought into contact with the end wall portion of the sleeve 122 on the right side of FIG. 8) according to the hydraulic pressure input to the first control port A1 and the second control port A2, thereby causing the selector valve 320 to be switched between the first state and the second state.

The spool 324, and the spool 124 of the first embodiment as well, has a plurality of land portions on its axial portion 325. However, the spool 324 differs from the spool 124 of the first embodiment in that the land portion 326 closest to the first position is comprised of a large diameter portion 327 on the first position side and a small diameter portion 328 on the second position side. The large diameter portion 327 has a diameter approximately the same as the inner diameter of the sleeve 122. On the other hand, the small diameter portion 328 has a diameter smaller than the inner diameters of the large diameter portion 327 and the sleeve 122 and larger than the diameter of the axial portion 325.

Further, unlike the hydraulic pressure circuit 100 of the first embodiment, the drain line 138 is not provided with a throttle, such as an orifice, but instead, an orifice 352 is provided on the fifth input line 145 in the hydraulic pressure circuit 300. This orifice 352 restricts the flow rate of the discharge oil from the electric pump 106 flowing in the fifth input line 145 to the predetermined value. Thus, the orifice 352 is equivalent to the throttle that restricts the drain amount from the drain portion 154 while the selector valve 320 is in the first state, similarly to the orifice 152.

The oil path leading to the drain portion 154 from the electric pump 106, that is, the path sequentially passing through the second main line 140, the fifth input line 145 and the drain line 138 similarly to the first embodiment, is open while the selector valve 320 is in the first state, thereby allowing the discharge oil from the electric pump 106 to be drained from the drain portion 154.

Thus, in the third embodiment, the discharge oil from the electric pump 106 is prevented from being trapped in the second main line 140 by the selector valve 320 when the electric pump 106 is actuated while the selector valve 320 is in the first state, similarly to the first embodiment. This can reduce an excessive load applied to the electric motor 105 that drives the electric pump 106.

Further, the drain amount of the discharge oil from the electric pump 106 is restricted to the predetermined value by the orifice 352 provided on the fifth input line 145, while the selector valve 320 is in the first state. This may enable an immediate rise of the hydraulic pressure to be given to the second control port A2 from the electric pump 106 when the electric pump 106 is actuated while the selector valve 320 is in the first state. Thus, the selector valve 320 can be switched from the first state to the second state more responsively.

On the other hand, as illustrated in FIG. 9, the small diameter portion 328 of the spool 324 faces the opening of the fifth input port B5 when the selector valve 320 is in the second state. Since a gap is formed between the small diameter portion 328 and the inner peripheral surface 330 of the sleeve 122, the fifth input port B5 and the drain output port C3 communicate with each other while the selector valve 320 is in the second state. Thus, while the selector valve 320 is in the second state, the oil path leading to the drain portion 154 from the electric pump 106, that is, the path sequentially passing through the second main line 140, the fifth input line 145 and the drain line 138, is open via the gap between the small diameter portion 328 and the inner peripheral surface 330 of the sleeve 122. Here, while the selector valve 320 is in the first state, the axial portion 325 of the spool 324 faces the opening of the fifth input port B5. Thus, the oil path leading to the drain portion 154 from the electric pump 106 is open via a gap between the axial portion 325 and the inner peripheral surface 330 of the sleeve 122. The gap between the small diameter portion 328 and the inner peripheral surface 330 of the sleeve 122 is smaller than the gap between the axial portion 325 and the inner peripheral surface 330 of the sleeve 122. Further, while the selector valve 320 is in the second state, the opening of the fifth input port B5 is partially closed by the end portion of the large diameter portion 327 closer to the second position.

This configuration leads to a less flow rate of the discharge oil (i.e., less drain amount from the drain portion 154) flowing through the oil path leading to the drain portion 154 from the electric pump 106 when the selector valve 320 is in the second state, compared to when the selector valve 320 is in the first state. As a result, less discharge oil is drained from the drain portion 154 when the selector valve 320 is in the second state, compared to when the selector valve 320 is in the first state.

Thus, in the third embodiment, the oil path leading to the drain portion 154 from the electric pump 106 is open while the selector valve 320 is in the second state, but with a reduced amount of draining from the drain portion 154 (i.e., less discharge oil from the electric pump 106 is drained from the drain portion 154) compared to while the selector valve 320 is in the first state. This allows for efficient supply of the hydraulic pressure to the low clutch 40 and the LR brake 60 from the electric pump 106, which leads to prevention of an increase in the capacity of the electric pump 106. Thus, the electric pump 106 is prevented from increasing in size, which allows for reducing power consumption while the engine 2 is automatically shut down.

Further, since the oil path leading to the drain portion 154 from the electric pump 106 is open while the selector valve 320 is in the second state, peak oscillations of the hydraulic pressure caused in the electric pump 106 can be lowered without using, as the electric pump 106, such an electric pump unit equipped with a relief valve which was described in the first embodiment. As a result, damage to the electric pump 106 due to the peak oscillations of the hydraulic pressure, and breakage of sealed portions on the low-clutch line 134, the LR-brake line 136 and other elements may be prevented.

Note that in the third embodiment, too, such an electric pump unit equipped with a relief valve which was described in the first embodiment may be used as the electric pump 106.

Further, in the third embodiment, one or both of the axial portion 325 and the small diameter portion 328 of the spool 324 always face the opening of the fifth input port B5 while the selector valve 320 is being switched, and the fifth input port B5 is never closed by the spool 324. Thus, the discharge oil from the electric pump 106 is prevented from being trapped in the second main line 140 by the selector valve 320 while the selector valve 320 is being switched.

Fourth Embodiment

A configuration of a hydraulic pressure circuit 400 according to a fourth embodiment will be described with reference to FIGS. 10 and 11. The hydraulic pressure circuit 400 is provided with, instead of the selector valve 120 in the hydraulic pressure circuit 100 of the first embodiment, a selector valve 420 switchable between the first state and the second state, similarly to the selector valve 120.

Figure 10:
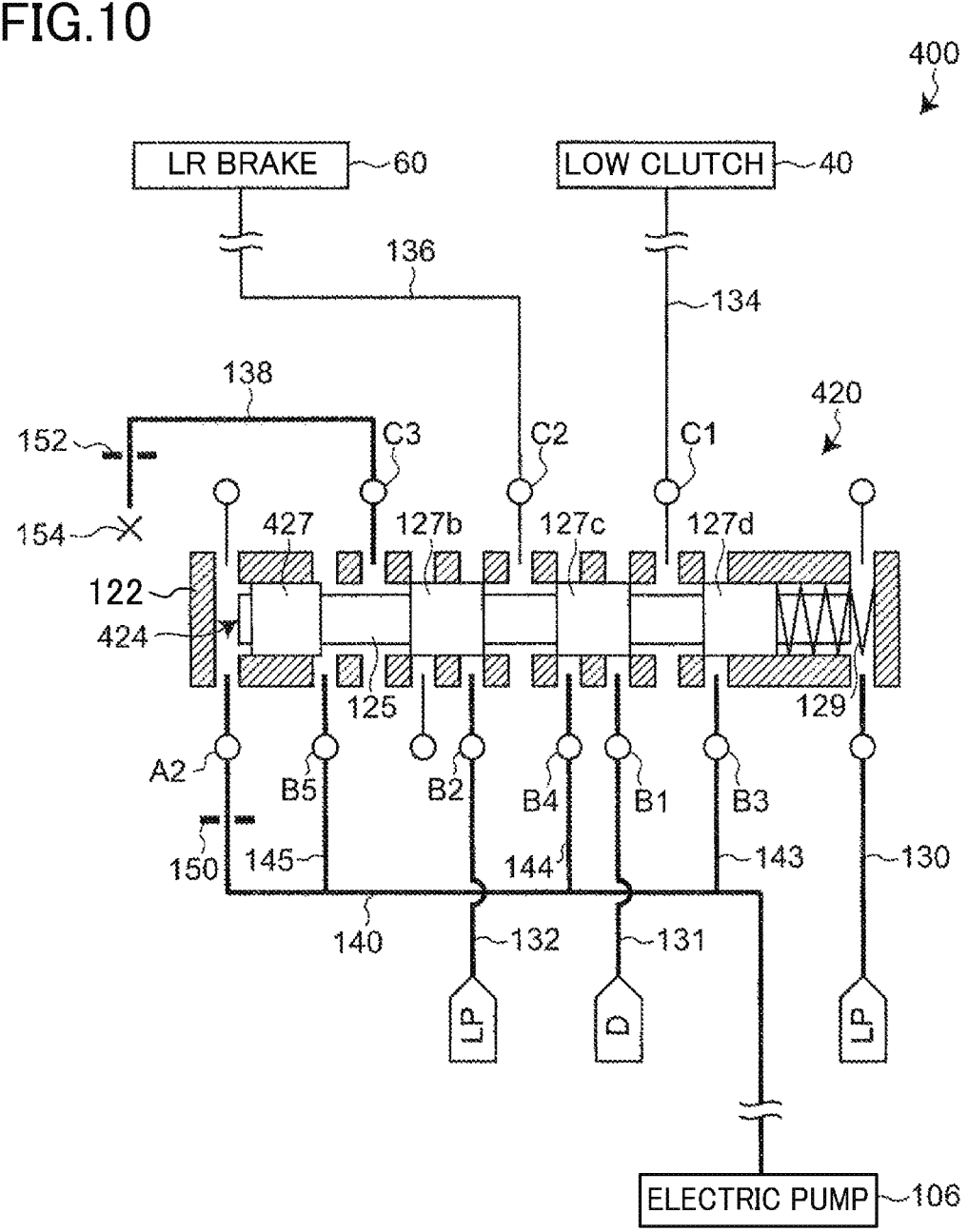
FIG. 10 is a circuit diagram showing a state during switching of a selector valve provided at a hydraulic pressure circuit of a fourth embodiment. The selector valve controls supply of the hydraulic pressure to the low clutch and the LR brake.
Figure 11:
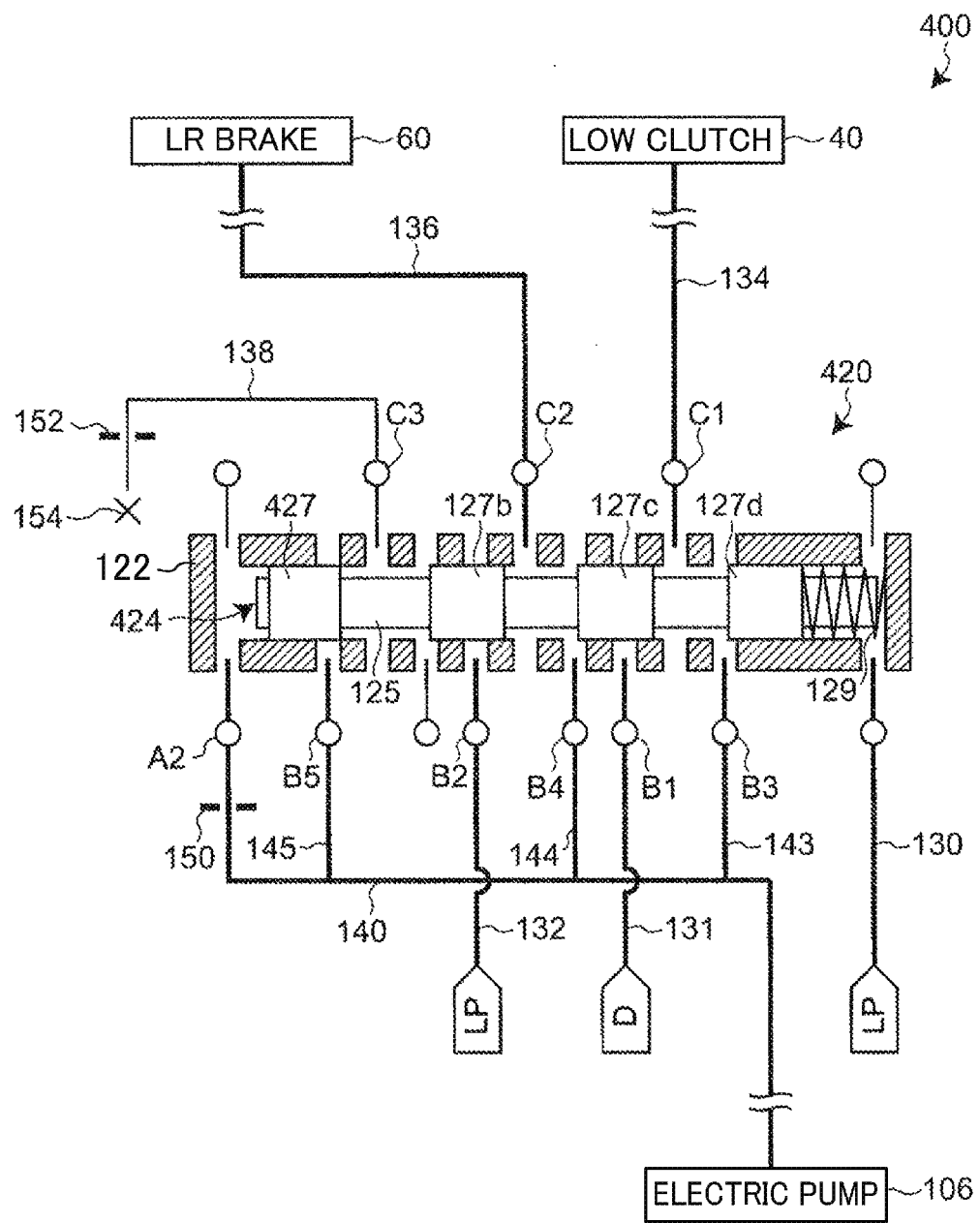
FIG. 11 is a circuit diagram showing a different state from the state shown in FIG. 10 during the switching of the selector valve shown in FIG. 10.

FIGS. 10 and 11 illustrate circuit diagrams of the hydraulic pressure circuit 400 according to the fourth embodiment. The hydraulic pressure circuit 400 controls the supply of the hydraulic pressure to the low clutch 40 and the LR brake 60. FIG. 10 is an enlarged view of the selector valve 420 in the hydraulic pressure circuit 400 and its peripheral elements, and shows a state of the selector valve 420 while the selector valve 420 is being switched. FIG. 11 shows another state of the selector valve 420 while the selector valve 420 is being switched, which is different from the state shown in FIG. 10.

Note that in the hydraulic pressure circuit 400 of the fourth embodiment, explanation of the same elements as those in the hydraulic pressure circuit 100 of the first embodiment will be omitted, and the same reference characters are used to designate such elements in FIGS. 10 and 11, or the designations are omitted.

Figure 12:
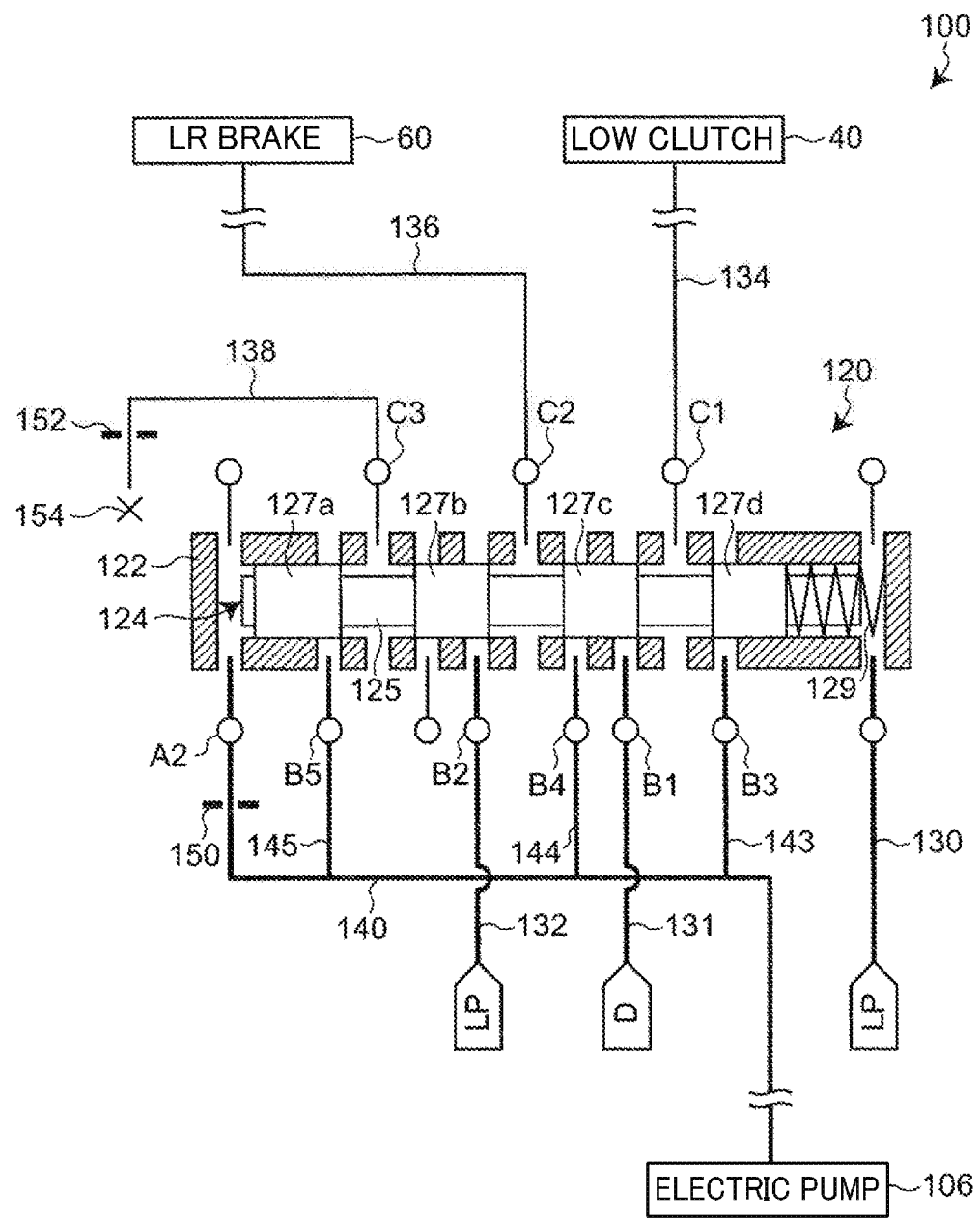
FIG. 12 is a circuit diagram showing a state during switching of a selector valve provided at the hydraulic pressure circuit of the first embodiment.
Figure 13:
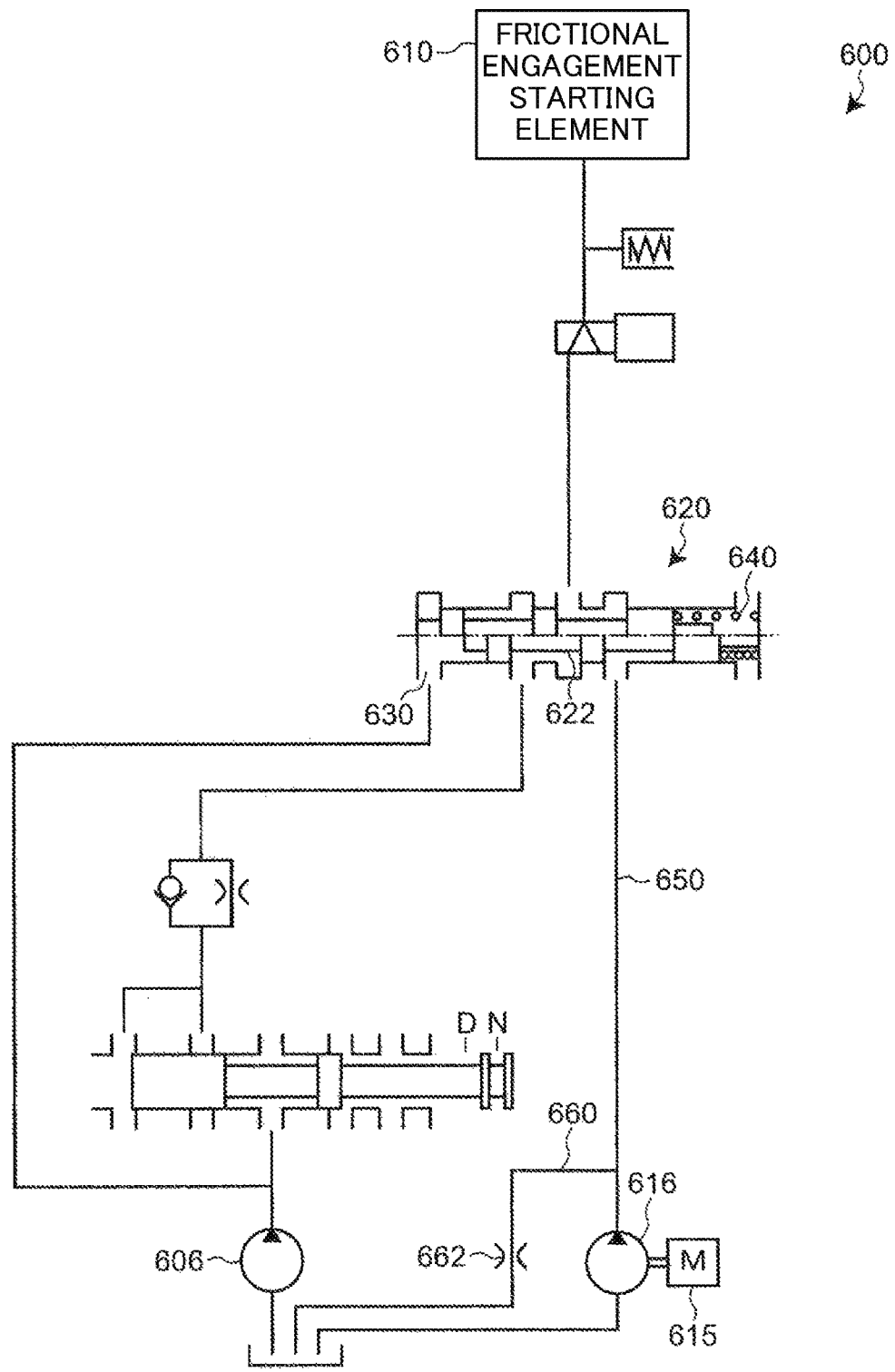
FIG. 13 is a circuit diagram of a known hydraulic pressure circuit for supplying a hydraulic pressure from an electric pump to a frictional engagement starting element.

FIG. 12 illustrates a circuit diagram of the selector valve 120 and its peripheral elements in the hydraulic pressure circuit 100 of the first embodiment, and shows a state of the selector valve 120 while the selector valve 120 is being switched. FIG. 12 is a drawing for explaining the fourth embodiment in comparison with the first embodiment.

In FIG. 12, the spool 124 of the selector valve 120 has an axial portion 125, and first, second, third and fourth land portions 127a, 127b, 127c, 127d, which are sequentially arranged on the axial portion 125 from the first position side, and spaced apart from one another. The respective distances between adjacent two of the first, second, third and fourth land portions 127a, 127b, 127c and 127d of the spool 124 are approximately the same.

With this configuration of the selector valve 120, the oil paths leading to the low clutch 40, the LR brake 60 and the drain portion 154 from the electric pump 106 are all blocked by the traveling spool 124 while the selector valve 120 is being switched from the first state to the second state due to the automatic shutdown of the engine 2, or while the selector valve 120 is being switched from the second state to the first state due to the restart of the engine 2 (at the moment shown in FIG. 12).

Specifically, at the moment shown in FIG. 12, the fifth input port B5 is closed by the first land portion 127a of the spool 124, and thereby the oil path passing through the fifth input line 145 and the drain line 138 and leading to the drain portion 154 is blocked. The fourth input port B4 is closed by the third land portion 127c, and thereby the oil path passing through the fourth input line 144 and the LR-brake line 136 and leading to the LR brake 60 is blocked. Also, the third input port B3 is closed by the fourth land portion 127d, and thereby the oil path passing through the third input line 143 and the low-clutch line 134 and leading to the low clutch 40 is blocked.

Further, when the spool 124 moves slightly from the state shown in FIG. 12 toward the first position (toward the left side of FIG. 12), the fifth input port B5 communicates with the drain output port C3, but the third and fourth input ports B3, B4 are closed by the fourth and third land portion 127d, 127c, respectively. That is, at this moment, the electric pump 106 communicates with the drain line 138 leading to the drain portion 154, but is blocked from the oil paths leading to the low clutch 40 and the LR brake 60 by the selector valve 120.

Further, when the spool 124 moves slightly from the state shown in FIG. 12 toward the second position (toward the right side of FIG. 12), the third and fourth input ports B3, B4 communicate with the low-clutch output port C1 and the LR-brake output port C2, respectively, but the fifth input port B5 is closed by the first land portion 127a. That is, at this moment, the electric pump 106 communicates with the low-clutch line 134 and the LR-brake line 136 leading to the low clutch 40 and the LR brake 60, respectively, but is blocked from the oil path leading to the drain portion 154 by the selector valve 120.

In this manner, the selector valve 120 of the first embodiment is configured such that the oil path leading to the drain portion 154 from the electric pump 106, or the oil paths leading to the low clutch 40 and the LR brake 60 from the electric pump 106, or all of these oil paths, is/are always blocked by the selector valve 120 while the selector valve 120 is being switched. All of these paths are blocked at the moment shown in FIG. 12. Thus, the discharge oil from the electric pump 106 is trapped in the second main line 140 by the selector valve 120 at the moment shown in FIG. 12. This leads to an excessive load instantaneously applied to the electric pump 106 while the selector valve 120 is being switched.

As illustrated in FIGS. 10 and 11, the spool 424 of the selector valve 420 in the hydraulic pressure circuit 400 of the fourth embodiment has an axial portion 125 similar to that of the spool 124 of the selector valve 120 of the first embodiment, and first, second, third and fourth land portions 427, 127b, 127c, 127d, which are sequentially arranged on the axial portion 125 from the first position side, and spaced apart from one another.

The second, third and fourth land portions 127b, 127c, 127d of this spool 424 has the same dimensions and locations in the axial direction as those of the spool 124, but the first land portion 427 has a different dimension in the axial direction from the first land portion 127a of the spool 124. Specifically, the first land portion 427 has a smaller dimension in the axial direction than the first land portion 127a of the spool 124. The distance between the first and second land portions 427, 127b is therefore longer than the distance between the first and second land portions 127a, 127b of the spool 124 by the distance equal to the difference in the dimension between the first land portion 427 and the first land portion 127a in the axial direction.

The other elements of the selector valve 420 except the spool 424 are the same as, or similar to, those of the selector valve 120 of the first embodiment. Also similarly to the first embodiment, the spool 424 moves between the first position (i.e., the position at which the spool 424 is brought into contact with the end wall portion of the sleeve 122 on the left side of the FIG. 10) and the second position (i.e., the position at which the spool 424 is brought into contact with the end wall portion of the sleeve 122 on the right side of FIG. 10) according to the hydraulic pressure input to the first control port A1 and the second control port A2, thereby switching the selector valve 420 between the first state and the second state.

In the fourth embodiment, as illustrated in FIG. 10, the third and fourth input ports B3, B4 are closed by the fourth and third land portions 127d, 127c of the spool 424, similarly to the spool 124, when the spool 424 is located at the same position, in the axial direction, as the spool 124 in FIG. 12 while the selector valve 420 is being switched. On the other hand, the fifth input port B5 is not closed by the first land portion 427 and communicates with the drain output port C3, since the first land portion 427 has a smaller dimension in the axial direction than the first land portion 127a of the spool 124.

Thus, the oil path passing through the second main line 140, the fifth input line 145 and the drain line 138 and leading to the drain portion 154 from the electric pump 106 is open at the moment shown in FIG. 10. This can prevent the discharge oil from the electric pump 106 from being trapped in the second main line 140 by the selector valve 420.

The state in which the electric pump 106 communicates with the drain portion 154, and the oil paths leading to the low clutch 40 and the LR brake 60 from the electric pump 106 are blocked by the selector valve 420 is not limited to the state shown in FIG. 10, but also occurs when the selector valve 420 is in the first state in which the spool 424 is located at the first position, and when the spool 424 is located at a position between the first position and the position shown in FIG. 10.

Further, when the spool 424 moves slightly from the state shown in FIG. 10 toward the second position (more to the first position than the state in FIG. 11), the fifth input port B5 communicates with the drain output port C3, and the third and fourth input ports B3, B4 communicate with the low-clutch output port C1 and the LR-brake output port C2, respectively. Thus, the electric pump 106 communicates with the drain line 138 leading to the drain portion 154, and the low-clutch line 134 and the LR-brake line 136 leading to the low clutch 40 and the LR brake 60.

Further, as illustrated in FIG. 11, the third and fourth input ports B3, B4 are not closed by the fourth and third land portions 127d, 127c of the spool 424, but communicate with the low-clutch output port C1 and the LR-brake output port C2, respectively, when the spool 424 is located closer to the second position than the spool 424 at the position shown in FIG. 10 is and when the fifth input port B5 is closed by the first land portion 427 while the selector valve 420 is being switched.

Thus, at the moment shown in FIG. 11, the oil path passing through the second main line 140, the third input line 143 and the low-clutch line 134 and leading to the low clutch 40 from the electric pump 106 is open, and the oil path passing through the second main line 140, the fourth input line 144 and the LR-brake line 136 and leading to the LR brake 60 from the electric pump 106 is also open. This can prevent the discharge oil from the electric pump 106 from being trapped in the second main line 140.

The state in which the electric pump 106 communicates with the low clutch 40 and the LR brake 60, and the oil path leading to the drain portion 154 from the electric pump 106 is blocked by the selector valve 420 is not limited to the state shown in FIG. 11, but also occurs when the selector valve 420 is in the second state in which the spool 424 is located at the second position, and when the spool 424 is located at a position between the second position and the position shown in FIG. 11.

In this manner, the hydraulic pressure circuit 400 of the fourth embodiment is configured such that the electric pump 106 communicates with the drain portion 154, the low clutch 40 and the LR brake 60 when the spool 424 is located between the positions shown in FIGS. 10 and 11. In other words, the hydraulic pressure circuit 400 is configured such that a period when the electric pump 106 communicates with a portion downstream of the selector valve 420 in the oil path leading to the drain portion 154, and a period when the electric pump 106 communicates with a portion downstream of the selector valve 420 in the oil paths leading to the low clutch 40 and the LR brake 60, overlap each other while the selector valve 420 is being switched.

Thus, in the fourth embodiment, the electric pump 106 always communicates with the low-clutch line 134 and the LR-brake line 136 leading to the low clutch 40 and the LR brake 60, respectively, or to the drain line 138 leading to the drain portion 154, or to the low-clutch line 134, the LR-brake line 136 and the drain line 138, while the selector valve 420 is being switched. As a result, the discharge oil from the electric pump 106 is prevented from being trapped not only while the selector valve 420 is in the first state, but also while the selector valve 420 is being switched, thereby preventing an excessive load from being applied to the electric pump 106 with reliability.

Note that in the fourth embodiment, the selector valve 420 may include a sixth input port B6 similar to the sixth input port B6 of the selector valve 220 of the second embodiment, and the hydraulic pressure circuit 400 may include a sixth input line 246 connected to the sixth input port B6, and an orifice 256 provided on the sixth input line 246, similarly to the second embodiment. In this case, similarly to the second embodiment, the oil path leading to the drain portion 154 from the electric pump 106 is open with less discharge oil drained from the drain portion 154 while the selector valve 420 is in the second state, compared to while the selector valve 420 is in the first state. This may lead to prevention of an increase in the capacity of the electric pump 106. In addition, peak oscillations of the hydraulic pressure caused in the electric pump 106 can be lowered without using, as the electric pump 106, such an electric pump unit equipped with a relief valve which was described in the first embodiment. As a result, damage to the electric pump 106 due to the peak oscillations of the hydraulic pressure, and breakage of sealed portions on the low-clutch line 134, the LR-brake line 136 and other elements may be prevented. The present invention is not limited to the above embodiments, and capable of substitutions without departing from the scope of the claims.

For example, a case in which the low clutch 40 and the LR brake 60 are engaged at the start of the vehicle has been described in the above embodiments. However, the number of frictional engagement elements to be engaged at the start of the vehicle is not specifically limited, and may be one or three or more. For example, in the case of having a one-way clutch in parallel with the LR brake 60, the frictional engagement element to be engaged at the start of the vehicle may be the low clutch 40 alone.

The foregoing embodiments are merely preferred examples in nature, and are not intended to limit the scope of the present invention. The scope of the present invention should be defined by the following claims, and variations and modifications belonging to a range equivalent to the claims are all within the scope of the present invention.

INDUSTRIAL APPLICABILITY

The present invention is useful as a hydraulic control unit for an automatic transmission mounted on a vehicle (specifically a vehicle with an idle stop control mechanism which automatically shuts down the engine while the vehicle stops).

DESCRIPTION OF REFERENCE CHARACTERS

1 Automatic Transmission
2 Engine
6 Mechanically-Operated Oil Pump
40 Low Clutch (a frictional engagement element to be engaged at vehicle's start)
60 LR Brake (a frictional engagement element to be engaged at vehicle's start)
100 Hydraulic Pressure Circuit
106 Electrically-Operated Oil Pump
120 Selector Valve
152 Orifice (a throttle that restricts a drain amount from a drain portion while the selector valve is in the first state)
154 Drain Portion
200 Hydraulic Pressure Circuit
220 Selector Valve
256 Orifice (a throttle that reduces a flow rate of the discharge oil from the electrically-operated oil pump which flows through the oil path leading to the drain portion from the electrically-operated oil pump while the selector valve is in the second state, compared to while the selector valve is in the first state)
300 Hydraulic Pressure Circuit
320 Selector Valve
352 Orifice (a throttle that restricts a drain amount from the drain portion while the selector valve is in the first state)
400 Hydraulic Pressure Circuit
420 Selector Valve

The invention claimed is:

1. A hydraulic control unit for an automatic transmission mounted on a vehicle, the hydraulic control unit comprising:
   a mechanically-operated oil pump driven by an engine of the vehicle;
   an electrically-operated oil pump actuated while the engine is automatically shut down; and
   a hydraulic pressure circuit configured to control supply of hydraulic pressure to a frictional engagement element to be engaged, in the automatic transmission, at a start of the vehicle, wherein
   the hydraulic pressure circuit has a selector valve switched between a first state in which the mechanically-operated oil pump is a source of the supply of the hydraulic pressure to the frictional engagement element, and a second state in which the electrically-operated oil pump is the source of the supply of the hydraulic pressure,
   the hydraulic pressure circuit is configured such that a discharge oil from the electrically-operated oil pump is drained from a predetermined drain portion when the selector valve is in the first state, and that less discharge oil is drained from the drain portion when the selector valve is in the second state, compared to when the selector valve is in the first state,
   the selector valve has a spool movable between a first position achieving the first state and a second position achieving the second state,
   the spool is pushed toward the second position by the hydraulic pressure from the electrically-operated oil pump applied to an end of one side of the spool, and pushed toward the first position by the hydraulic pressure from the mechanically-operated oil pump applied to an end of the other side of the spool, and
   a throttle is arranged on an oil path leading to the drain portion from the electrically-operated oil pump, the throttle restricting a drain amount from the drain portion while the selector valve is in the first state.

2. The hydraulic control unit of claim 1, wherein
   the selector valve is arranged on the oil path leading to the drain portion from the electrically-operated oil pump, and
   the hydraulic pressure circuit is configured such that the oil path is open while the selector valve is in the first state, and that the oil path is blocked while the selector valve is in the second state, to drain less discharge oil from the drain portion, compared to while the selector valve is in the first state.

3. The hydraulic control unit of claim 2, wherein
   the hydraulic pressure circuit further includes an oil path starting from the electrically-operated oil pump, passing through the selector valve, and leading to the frictional engagement element, and
   the selector valve is configured such that a period when the electrically-operated oil pump communicates with a portion downstream of the selector valve in the oil path leading to the drain portion from the electrically-operated oil pump, and a period when the electrically-operated oil pump communicates with a portion downstream of the selector valve in the oil path leading to the frictional engagement element from the electrically-operated oil pump, overlap each other while the selector valve is being switched between the first state and the second state.

4. The hydraulic control unit of claim 1, wherein
   the selector valve is arranged on the oil path leading to the drain portion from the electrically-operated oil pump, and
   the hydraulic pressure circuit is configured such that the oil path is open while the selector valve is in the first state, and that the oil path is open via a throttle which lowers, compared to while the selector valve is in the first state, a flow rate of the discharge oil flowing in the oil path while the selector valve is in the second state, to drain less discharge oil from the drain portion, compared to while the selector valve is in the first state.

5. The hydraulic control unit of claim 4, wherein
   the hydraulic pressure circuit further includes an oil path starting from the electrically-operated oil pump, passing through the selector valve, and leading to the frictional engagement element, and
   the selector valve is configured such that a period when the electrically-operated oil pump communicates with a portion downstream of the selector valve in the oil path leading to the drain portion from the electrically-operated oil pump, and a period when the electrically-operated oil pump communicates with a portion downstream of the selector valve in the oil path leading to the frictional engagement element from the electrically-operated oil pump, overlap each other while the selector valve is being switched between the first state and the second state.

6. A hydraulic control unit for an automatic transmission mounted on a vehicle, the hydraulic control unit comprising:

a mechanically-operated oil pump driven by an engine of the vehicle;

an electrically-operated oil pump actuated while the engine is automatically shut down; and a hydraulic pressure circuit configured to control supply of hydraulic pressure to a frictional engagement element to be engaged, in the automatic transmission, at a start of the vehicle, wherein the hydraulic pressure circuit has a selector valve switched between a first state in which the mechanically-operated oil pump is a source of the supply of the hydraulic pressure to the frictional engagement element, and a second state in which the electrically-operated oil pump is the source of the supply of the hydraulic pressure, the hydraulic pressure circuit is configured such that a discharge oil from the electrically-operated oil pump is drained from a predetermined drain portion when the selector valve is in the first state, and that less discharge oil is drained from the drain portion when the selector valve is in the second state, compared to when the selector valve is in the first state, the selector valve is arranged on an oil path leading to the drain portion from the electrically-operated oil pump, and the hydraulic pressure circuit is configured such that the oil path is open while the selector valve is in the first state, and that the oil path is blocked while the selector valve is in the second state, to drain less discharge oil from the drain portion, compared to while the selector valve is in the first state.

7. The hydraulic control unit of claim 6, wherein the hydraulic pressure circuit further includes an oil path starting from the electrically-operated oil pump, passing through the selector valve, and leading to the frictional engagement element, and the selector valve is configured such that a period when the electrically-operated oil pump communicates with a portion downstream of the selector valve in the oil path leading to the drain portion from the electrically-operated oil pump, and a period when the electrically-operated oil pump communicates with a portion downstream of the selector valve in the oil path leading to the frictional engagement element from the electrically-operated oil pump, overlap each other while the selector valve is being switched between the first state and the second state.

* * * * *